US005655014A

United States Patent [19]

Walsh et al.

[11] Patent Number: 5,655,014

[45] Date of Patent: Aug. 5, 1997

[54] SWITCHING DEVICE INDEPENDENT COMPUTER-TELEPHONE INTEGRATION SYSTEM

[75] Inventors: Maryann P. Walsh, Chelmsford; Paul M. Gasparro, Sudbury, both of Mass.

[73] Assignee: Aurora Systems, Inc., Acton, Mass.

[21] Appl. No.: 198,494

[22] Filed: Feb. 18, 1994

[51] Int. Cl.[6] .......... H04M 3/42

[52] U.S. Cl. .......... 379/201; 379/242; 379/289

[58] Field of Search .......... 379/201, 202, 379/203, 204, 205, 206, 207, 96, 211, 212, 210, 265, 266, 88, 67, 279, 9, 14, 165, 289

[56] References Cited

U.S. PATENT DOCUMENTS

| | | | |
|---|---|---|---|
| Re. 34,536 | 2/1994 | Frimmel, Jr. | 379/88 |
| 4,799,144 | 1/1989 | Parruck et al. | 379/88 |
| 4,878,240 | 10/1989 | Lin et al. | 379/67 |
| 5,008,930 | 4/1991 | Gawrys et al. | 379/96 |
| 5,038,374 | 8/1991 | Kaufman et al. | 379/98 |
| 5,214,688 | 5/1993 | Szlam et al. | 379/67 |
| 5,291,551 | 3/1994 | Conn et al. | 379/265 |
| 5,309,505 | 5/1994 | Szlam et al. | 379/88 |
| 5,333,180 | 7/1994 | Clary et al. | 379/94 |
| 5,335,268 | 8/1994 | Kelly, Jr. et al. | 379/112 |
| 5,406,557 | 4/1995 | Baudoin | 370/61 |
| 5,414,762 | 5/1995 | Flisik et al. | 379/198 |
| 5,420,916 | 5/1995 | Sekiguchi | 379/219 |
| 5,440,613 | 8/1995 | Fuentes | 379/60 |

*Primary Examiner*—Krista M. Zele
*Assistant Examiner*—Scott Wolinsky
*Attorney, Agent, or Firm*—Wolf, Greenfield & Sacks, P.C.

[57] ABSTRACT

A switching device independent computer-telephone integration system including a computer; an established set of telephone functions for commanding the computer; a library including a plurality of telephone switching device commands for a number of different types of switching devices; and a state machine, operable on the computer, for translating the switching device commands into equivalent established telephone functions for uniformly processing incoming telephone calls independent of switching device dependent commands.

28 Claims, 30 Drawing Sheets

| FIG. 19A | FIG. 19B |
|---|---|

| HANGUP REQUESTED 5 | HOLD 6 | HOLD REQUESTED 7 | TRANSFER COMPLETE PENDING 8 | TRANSFER REQUESTED 9 | CONFER-ENCE COMPLETE PENDING 10 | CONFER-ENCE REQUESTED 11 |
|---|---|---|---|---|---|---|
| S= 2 | S= 2 | S= 2 | S= 2 | S= 2 | S= 2 | S= 2 |
| S= 4 | S= 4 | S= 4 | S= 4 | S= 4 | S= 4 | S= 4 |
| S= 1 | S= 1 | S= 1 | S= 1 | S= 1 | S= 1 | S= 1 |

FIG. 20B

| HANGUP REQUESTED 5 | HOLD 6 | HOLD REQUESTED 7 | TRANSFER COMPLETE PENDING 8 | TRANSFER REQUESTED 9 | CONFER-ENCE COMPLETE PENDING 10 | CONFER-ENCE REQUESTED 11 |
|---|---|---|---|---|---|---|
| S= 8 | S= 8 | S= 8 | S= 1 | S= 8 | S= 8 | S= 8 |
| S= 6 | S= 6 | S= 6 | S= 6 | S= 6 | S= 6 | S= 6 |
| S= 1 | S= 1 | S= 1 | S= 1 | S= 1 | S= 1 | S= 1 |

FIG. 21B

| HANGUP REQUESTED 5 | HOLD 6 | HOLD REQUESTED 7 | TRANSFER COMPLETE PENDING 8 | TRANSFER REQUESTED 9 | CONFER-ENCE COMPLETE PENDING 10 | CONFER-ENCE REQUESTED 11 |
|---|---|---|---|---|---|---|
| S= 5 | S= 6 | S= 7 | S= 8 | S= 9 | S= 10 | S= 11 |
| S= 5 | S= 6 | S= 7 | S= 4 | S= 4 | S= 4 | S= 4 |
| S= 1 | S= 6 | S= 7 | S= 8 | S= 9 | S= 10 | S= 11 |
| S= 2 | S= 2 | S= 2 | S= 2 | S= 2 | S= 2 | S= 2 |

FIG. 22B

| HANGUP REQUESTED 5 | HOLD 6 | HOLD REQUESTED 7 | TRANSFER COMPLETE PENDING 8 | TRANSFER REQUESTED 9 | CONFER-ENCE COMPLETE PENDING 10 | CONFER-ENCE REQUESTED 11 |
|---|---|---|---|---|---|---|
| A= REQUEST ANSWER S= 3 | A= REQUEST ANSWER S= 3 | A= S= 7 | A= REQUEST ANSWER S= 3 | A= REQUEST ANSWER S= 3 | A= REQUEST ANSWER S= 3 | A= REQUEST ANSWER S= 3 |
| A= S= 5 | A= S= 6 | A= S= 7 | A= REQUEST TRANSFER COMPLETE S= 5 | A= S= 9 | A= S= 10 | A= S= 11 |
| A= S= 5 | A= S= 6 | A= S= 7 | A= REQUEST TRANSFER COMPLETE S= 5 | A= S= 9 | A= S= 10 | A= S= 11 |

FIG. 23B

SWITCHING DEVICE INDEPENDENT COMPUTER-TELEPHONE INTEGRATION SYSTEM

FIELD OF INVENTION

This invention relates to a computer-telephone integration system which is telephone switching device independent.

BACKGROUND OF INVENTION

Computer-Telephone Integration (CTI) generally refers to a system in which a computer automatically responds to an incoming (or outgoing) telephone call. One application is in the consumer catalog business for a computer system which includes a data base of catalogue items and previous orders by customers. A computer-telephone integration system lets the customer service representative know the name of the calling customer without asking. The caller's telephone number, or a keyed in identification number, is extracted from the telephone system and fed into the computer to automatically retrieve and display data as required. Computer-telephone integration systems save time and greatly increase productivity. Such systems are used in the airline industry for handling fare and ticket queries and in many other businesses which regularly handle customer calls.

Computer-Telephone Integration is also applicable to outbound call handing. In applications such as account collections, a user of a CTI system could make many more contacts per day by the more efficient call processing that CTI affords. For example, A CTI system can automatically extract a telephone number from an application database record, and send commands to the telephone switching device that will dial the number extracted. This reduces keystroke and button push time for the user. In addition, A CTI system could command the telephone switching device to automatically dial from a list of telephone numbers (e.g. delinquent accounts) and not connect the call to a user until it has been determined that a live person has answered, eliminating calls unanswered, busy calls and calls answered by a telephone answering device.

There are, however, many different manufacturers of telephone switching devices used in a computer-telephone integration system. And, each manufacturer generally establishes unique protocols for the telephone functions to be performed on the computer such as the dial, hold, answer, conference, and transfer functions.

So, those skilled in the art must write specific interface programs so that the commands from the computer keyboard are correctly recognized by the telephone switching device, and vice-versa. But these specific interface programs will not necessarily work at another site and/or in connection with other types of telephone switching devices.

In general then, computer telephone integration systems are generally custom designed and integrated for individual customers for use only at the customer site.

SUMMARY OF INVENTION

It is therefore an object of this invention to provide a computer telephone integration system which does not require programming skills to set up and operate.

It is a further object of this invention to provide such a computer-telephone integration system which uniformly processes incoming and outgoing telephone calls independent of the different switching device command protocols established by the telephone switch manufacturer.

It is a further object of this invention to provide such a computer-telephone integration system which, when provided to the end user, correctly interfaces with many different types of application programs, telephone switching devices, and call handling priority rule procedures.

It is a further object of this invention to provide an ergonomic computer-telephone integration system which is user friendly and does not require programming skills or knowledge of telephone switching device protocols.

This invention results from the realization that a switching device independent computer-telephone integration system is effected by establishing a library of a uniform set of telephone functions and a state machine which translates stored switch commands for many different types of switching devices into the uniform telephone functions thereby eliminating the need to individually program the computer to interface with each type of switching device. This establishes a single user interface within the middleware which allows a user to perform the telephone functions in the same manner, regardless of the application or telephone switching device environments. Thereby solving the problem of having to write site specific interface programs so that the computer correctly interfaces with the telephone system. Any switching device dependent commands (those unique to individual switching devices) are converted to the uniform switching device independent commands for processing incoming calls within the system and conversely, for outgoing calls, the uniform switching, device independent commands and converted back to the appropriate switching device dependent commands so that the switching device can properly place an outgoing call.

This invention comprises a switching device independent computer-telephone integration system including computer means; an established set of telephone commands that communicate a state of the switching device to the computer means a library including a plurality of telephone switching device commands for a number of different types of switching devices; and state machine means, operable on the computer means, for translating the switching device commands into equivalent established telephone functions for uniformly processing incoming telephone calls.

The state machine means further includes means for translating the established telephone functions into equivalent switching device commands for uniformly processing outgoing telephone calls. The state machine means includes telephone interface means in communication with a switching device for detecting events occurring on the switching device and processing switch device dependent communications. The state machine means further includes call processor means in communication with the telephone interface means for processing switch device independent communications in accordance with the established telephone functions and call control means in communication with the call processor means for communicating a user request to the call processor means via switching device independent communications in accordance with the established set of telephone functions.

Also featured is a system for uniformly processing incoming telephone calls independent of individual switching device commands for a computer in communication with a telephone system through a switching device comprising an established set of telephone commands for communicating a state of the switching device to the computer; a library including a plurality of telephone switching device commands for a number of different types of switching devices; and state machine means, operable on the computer for translating the switching device commands into the equivalent established telephone functions for uniformly processing incoming telephone calls. The state machine means further includes means for translating the established telephone functions into equivalent switching device commands for uniformly processing outgoing telephone calls.

This invention further features a method for establishing a switching device independent computer-telephone integration system comprising storing a set of telephone functions for commanding a computer on a computer; establishing a library including a plurality of telephone switching device commands for a number of different types of switching devices; and translating the switching device commands into equivalent established telephone functions for uniformly processing incoming telephone calls. The method further includes translating the established telephone functions into equivalent switching device commands for uniformly processing outgoing telephone calls.

The method for processing telephone calls on a computer-telephone integration system independent of switching device protocols comprises receiving switching device dependent commands from a switching device; converting the switching device dependent commands into switching device independent commands; and processing the switching device independent commands within the system for uniformly operating the system independent of switching device dependent commands.

The method further includes receiving switching device independent commands from a system user to be communicated to the switching device and converting the switching device independent commands into switching device dependent commands for operating the switching device.

The step of converting includes searching a library of telephone switching device dependent commands until a match for the received switching device dependent command is found in then converting that command into a switching device independent command associated with the switching device dependent command.

This invention further features a system for uniformly processing incoming telephone calls independent of individual switching device commands for a computer-telephone integration system including a computer in communication with a telephone system through a switching device comprising means for receiving switching device dependent commands from the switching device; means for converting the switching device dependent commands into switching device independent commands; and means for processing the switching device independent commands within the computer-telephone integration system for uniformly operating the computer independent of switching device dependent commands.

The means for converting includes a library of telephone switching device dependent commands, for searching the library until a match for a received switching device dependent commands is found, and means for converting that command into a switching device independent command associated with the switching device dependent command for transmission to the means for processing.

DISCLOSURE OF PREFERRED EMBODIMENT

Other objects, features and advantages will occur to those skilled in the art from the following description of a preferred embodiment and the accompanying drawings, in which.

Figure 18:
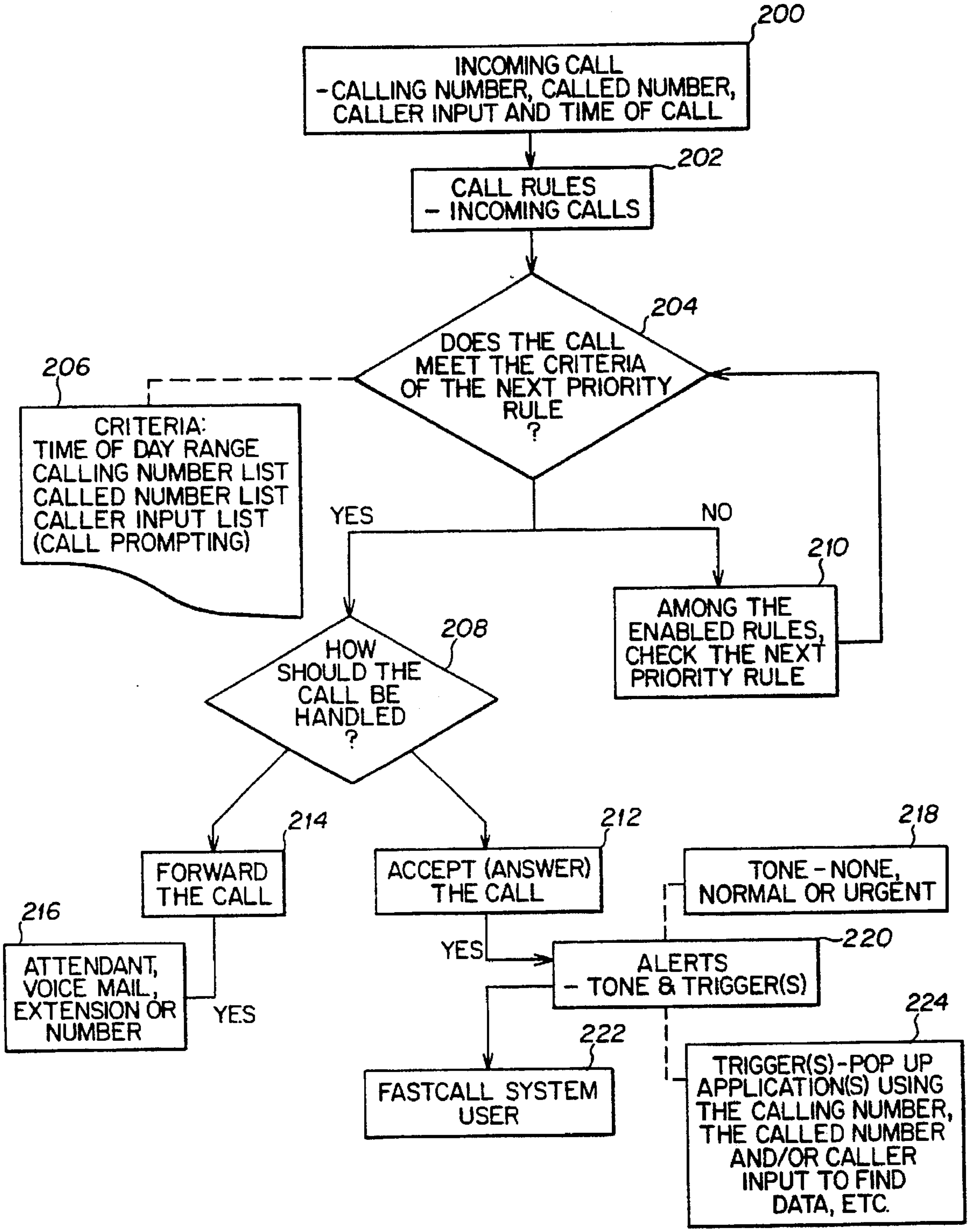
Figures 19, 19A:
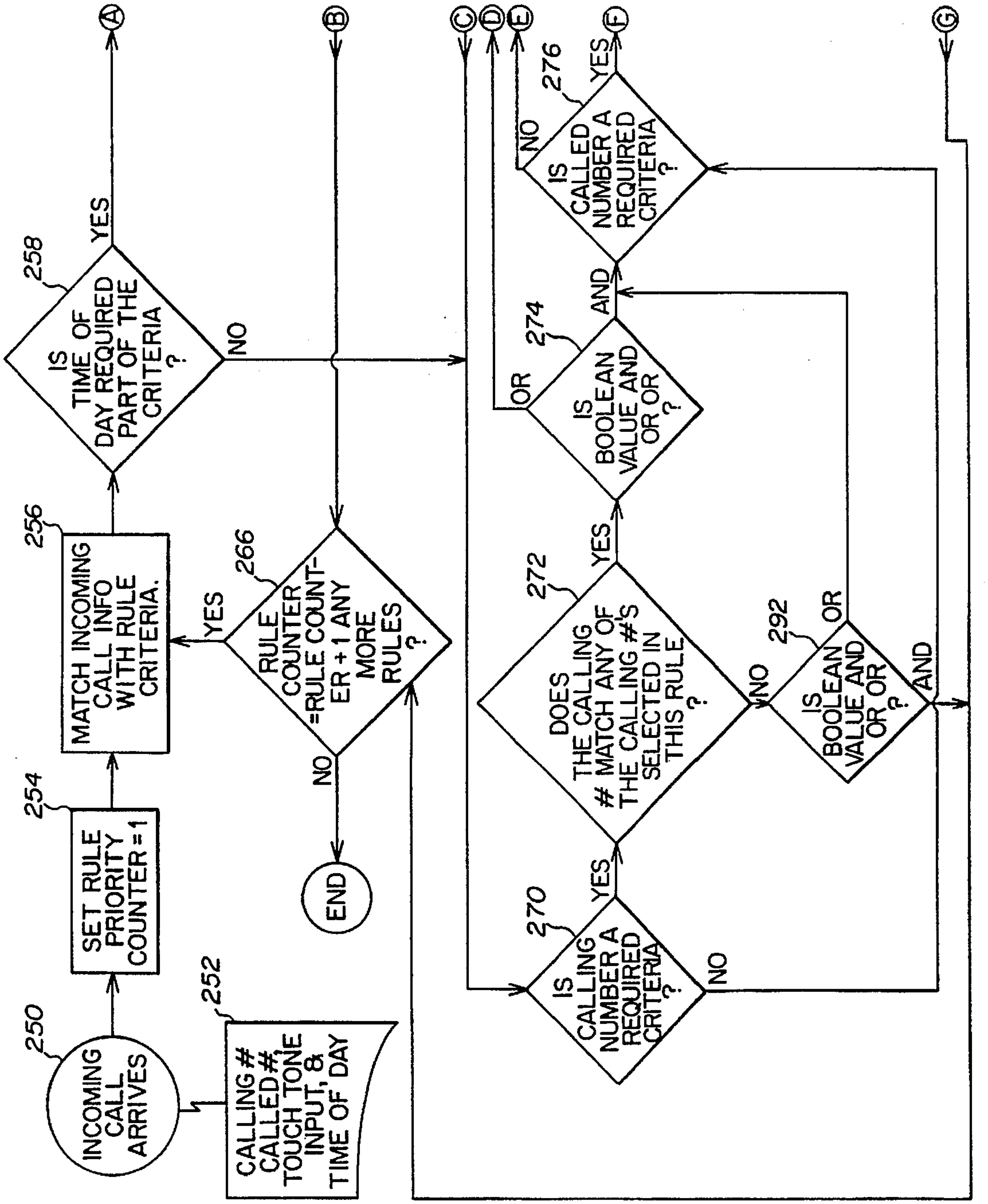
Figure 19B:
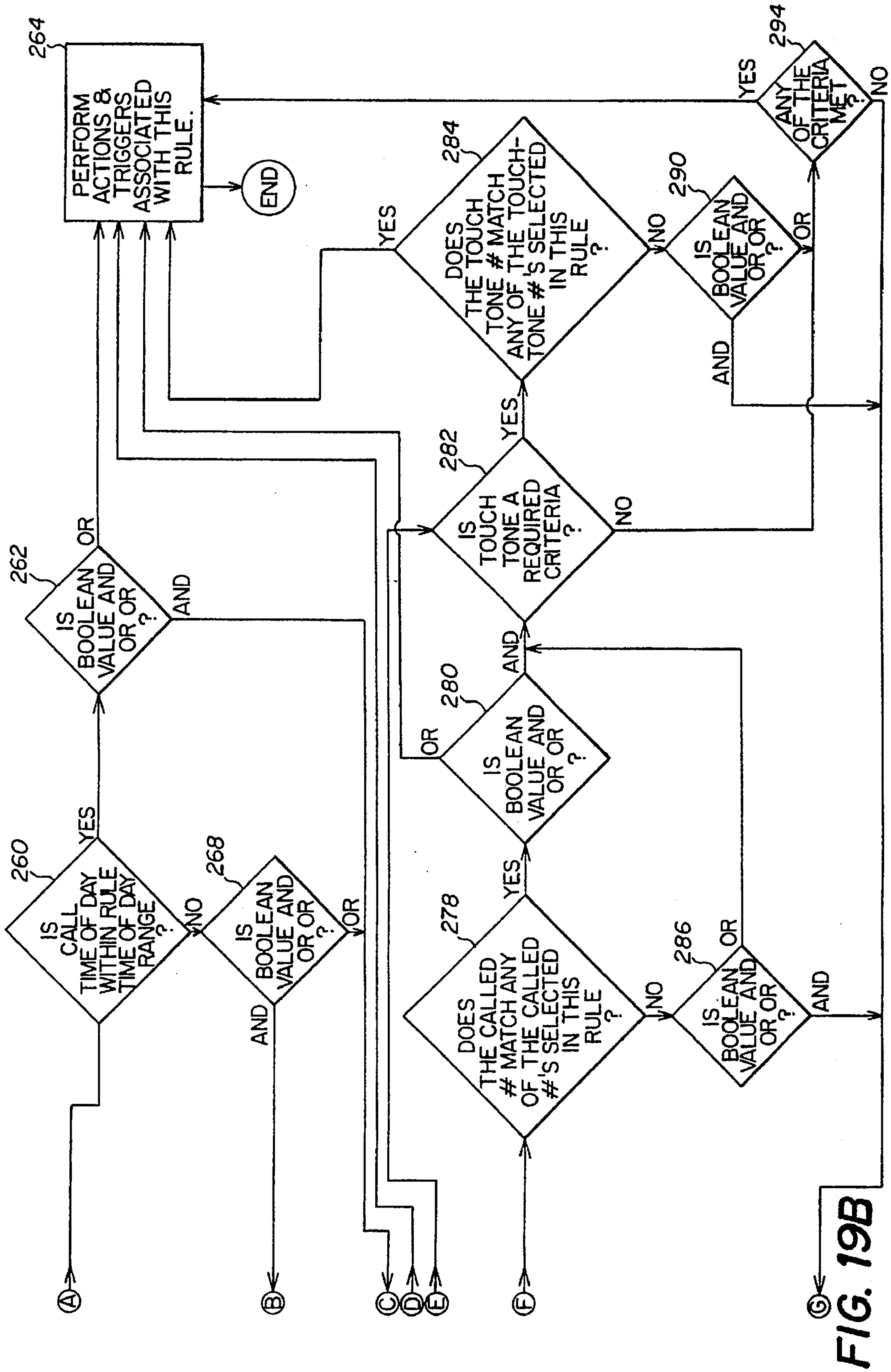

FIGS. 18–19 are block diagrams of the rules-based call processing routines of the computer-telephone integration system according to this invention; and FIGS. 20–23 are a block diagrams of the state machine for translating stored switching device commands into established telephone functions for uniformly processing incoming telephone calls independent of individual switching device commands of the computer-telephone integration system of this invention.

THE COMPUTER-TELEPHONE INTEGRATION SYSTEM

Figure 1:
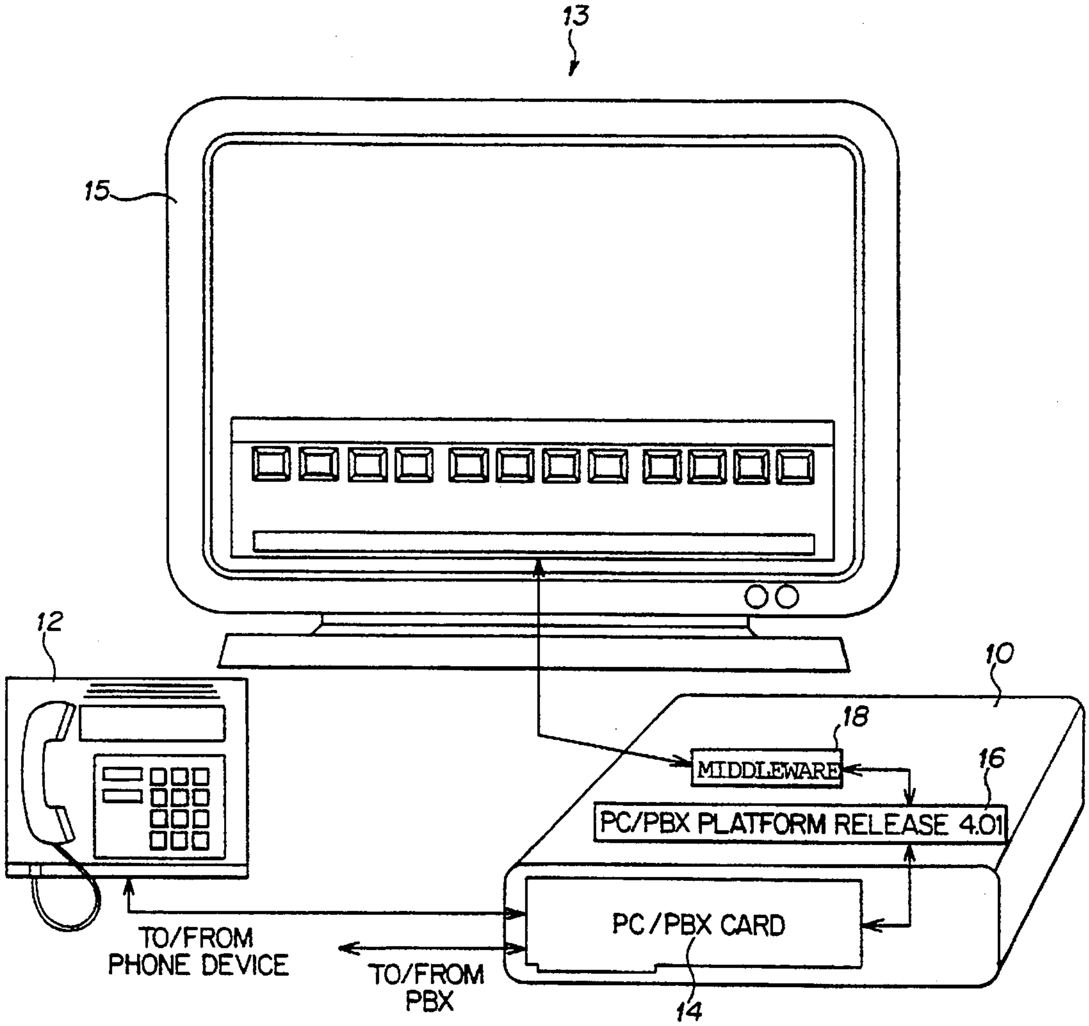
FIG. 1 is a schematic diagram of the primary hardware and software subsystems of the computer-telephone integration system of this invention.

The computer-telephone integration system 13 of this invention includes computer 10, FIG. 1, such as an IBM compatible personal computer. Connected to computer 10 is telephone system including an AT&T 7400 Series Telephone 12. System 13 also includes a switching device comprising a switch interface 14 such as an AT&T PC/PBX Card and switch interface drivers 16 such as PC/PBX Platform Release 4.01 for extracting call information (such as a telephone number) from an incoming call received by the telephone system and forwarding call information to computer 10. Switch interface 14 could also be a stand alone module that plugs into a communication port of the computer. Alternatively switch interface 14 could be a local area network connection to a server which is centrally interfaced to the switch. Monitor 15 is for viewing database records, spreadsheet data and the like automatically retrieved in response to an incoming call on the telephone system.

According to this invention, middleware program layer 18 is "inserted" between computer 10 (and the application programs operating thereon) the switching device 14 and the platform release 16, which is interfaced to the telephone system, to uniformly configure computer 10.

Middleware program layer 18 automatically and uniformly configures computer 10 so that the commands required to retrieve files from any application program stored on computer 10 are recorded and then executed in response to an incoming call.

By way of example, if computer 10 is used in a large university, one application program may be a database of student grade data, one application program may be a database of student loan data, and one application program may be a spreadsheet including charitable contribution information. A WINDOWS type operating system provides access to the application programs running on local or remote computer hardware as is known. As discussed in the Background of Invention above, since the grade database, the student loan database, and charitable contribution spreadsheet application programs might all have different command string sequences to retrieve files and data, computer 10 would normally be individually programmed such that when a telephone call is received, one program operates to retrieve grade information, one program operates to receive student loan information, and still a third program operates to retrieve charitable contribution information. These programs, however, may not work on different computer systems which also may interface with different types of telephone switch devices. And, if the user of the system adds another application program, a programmer would be called in to add still another interface program.

This labor intensive prior method is eliminated according to this invention which is described in more detail below.

Figure 3:
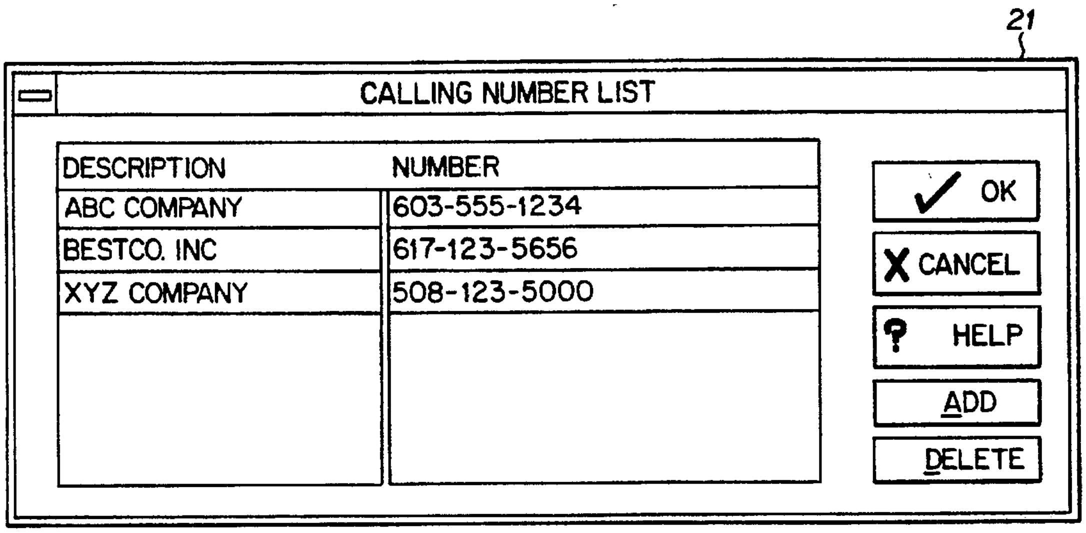
FIG. 3 is a view of a semen for entering telephone numbers according to the set-up routine of FIG. 2.
Figure 4:
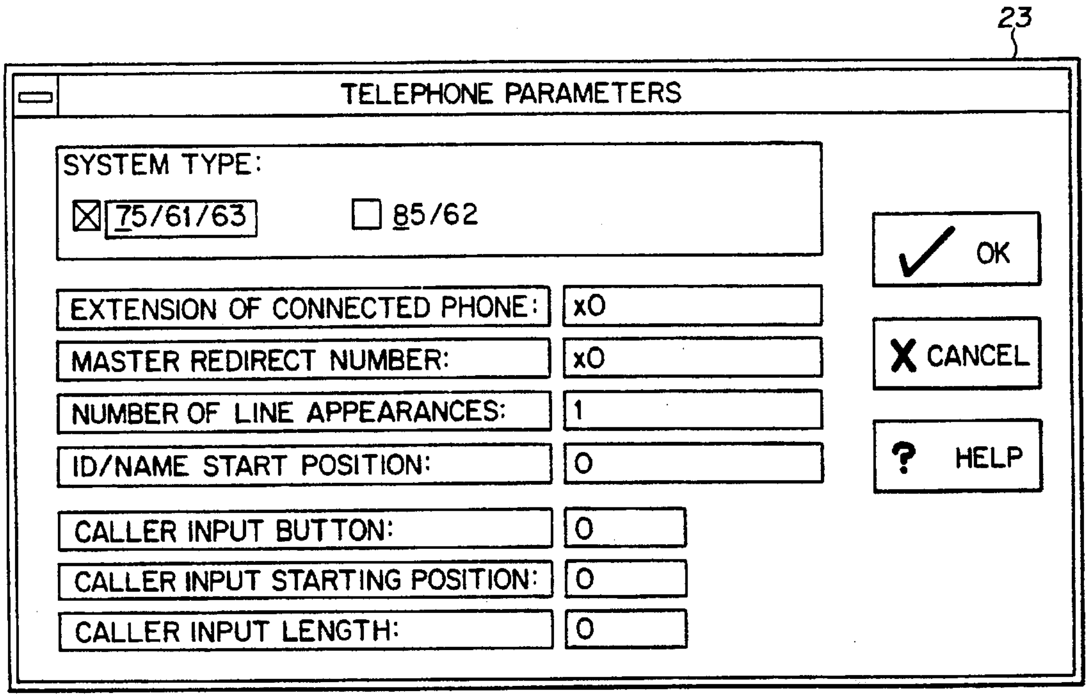
FIG. 4 is a view of a screen for denoting the telephone parameters according to the set-up routine of FIG. 2.
Figure 5:
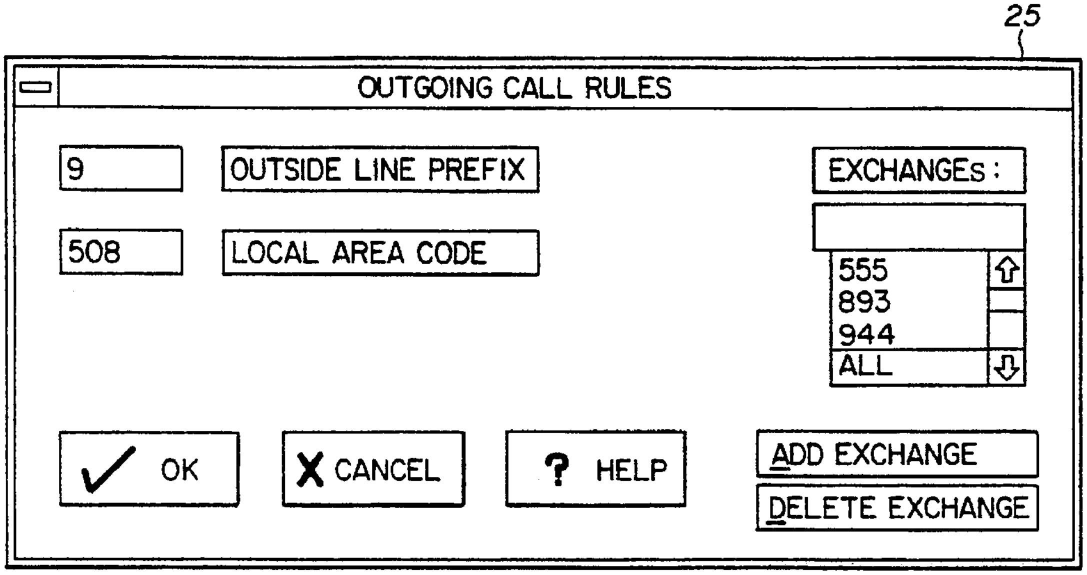
FIG. 5 is a view of a screen for entering area code information according to the set-up routine of FIG. 2.
Figure 6:
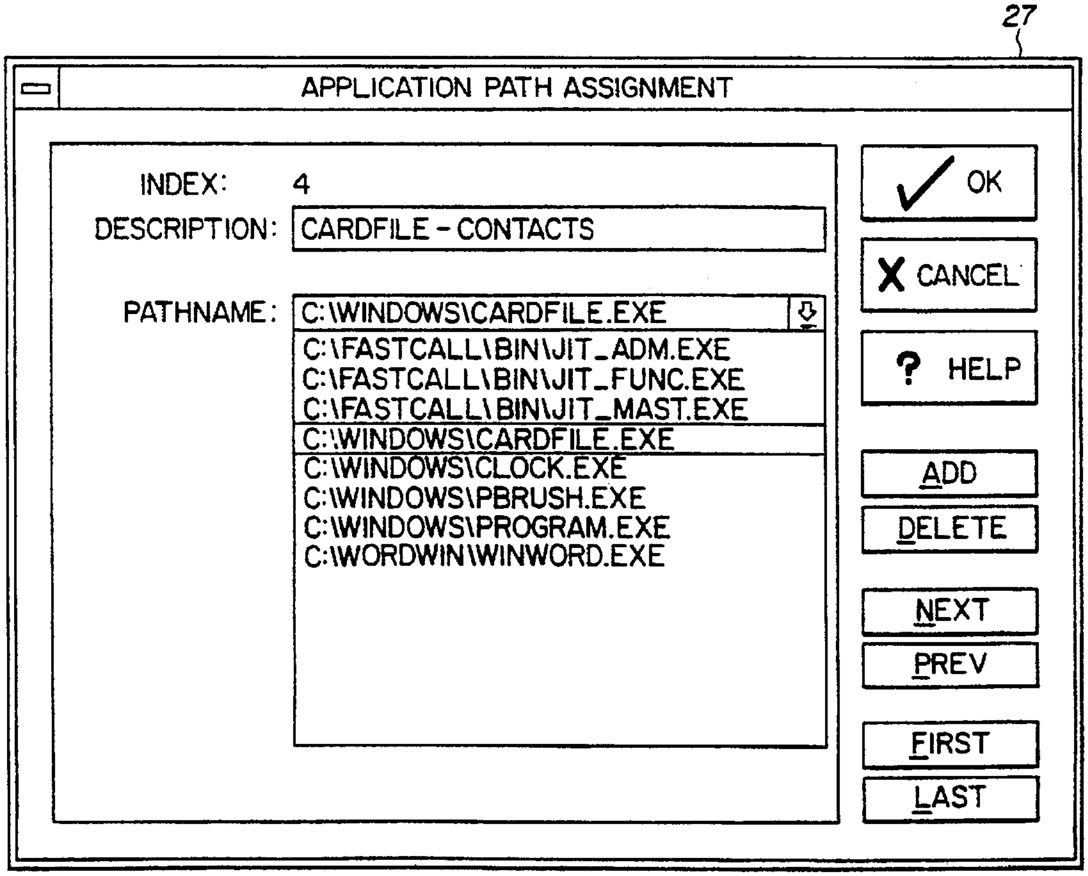
FIG. 6 is a view of a screen for entering application path assignments according to the set-up routine FIG. 2.

Uniform Configuration Of The Computer-telephone System To Access Application Program Data According to this invention, middleware program 18, FIG. 1, operates on computer 10 providing uniform configuration of computer 10 to handle incoming and outgoing calls. Middleware program 18 allows the user to enter the system phone numbers and dialing parameters, steps 20 and 22, FIG. 2. FIG. 3 shows screen 21 of middleware program 18 for entering the system telephone numbers; FIG. 4 shows screen 23 for entering the system type and parameters, FIG. 5 shows screen 25 for entering area code information, and screen 27, FIG. 6 shows selection of application path assignments.

Figure 7:
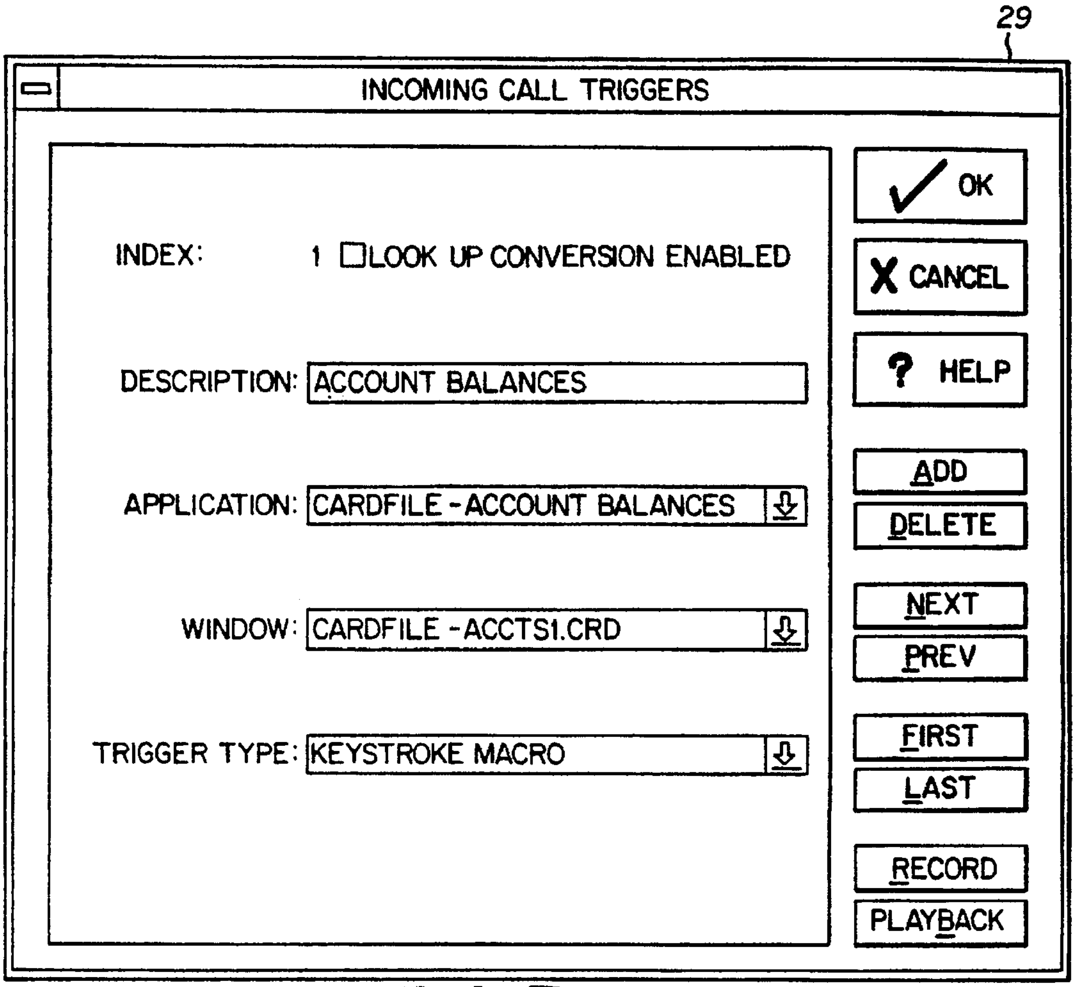
FIG. 7 is a view of a screen for entering incoming call triggers according to the set-up routine of FIG. 2.

For example the user site may have a number of telephone lines each of which receive incoming calls. Middleware program 18 then allows the user to enter the system applications, step 24, FIG. 2. The database and spreadsheet application programs discussed above are entered in screen 29, FIG. 7. Since there may be different windows for each application, the user enters the windows for each application, as shown in screen 29, FIG. 7 and screen 33, FIG. 9 for incoming and outgoing calls respectively.

Figure 8:
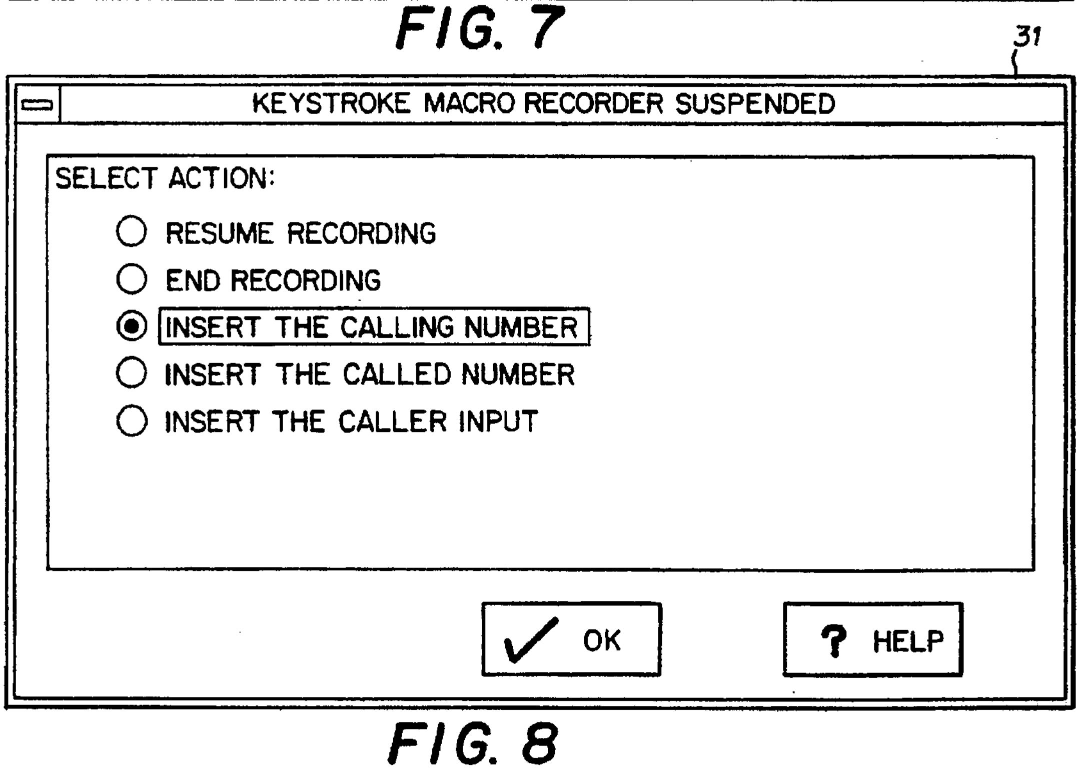
FIG. 8 is a view of a screen for entering windows for incoming calls according to the set-up routine of FIG. 2.
Figure 9:
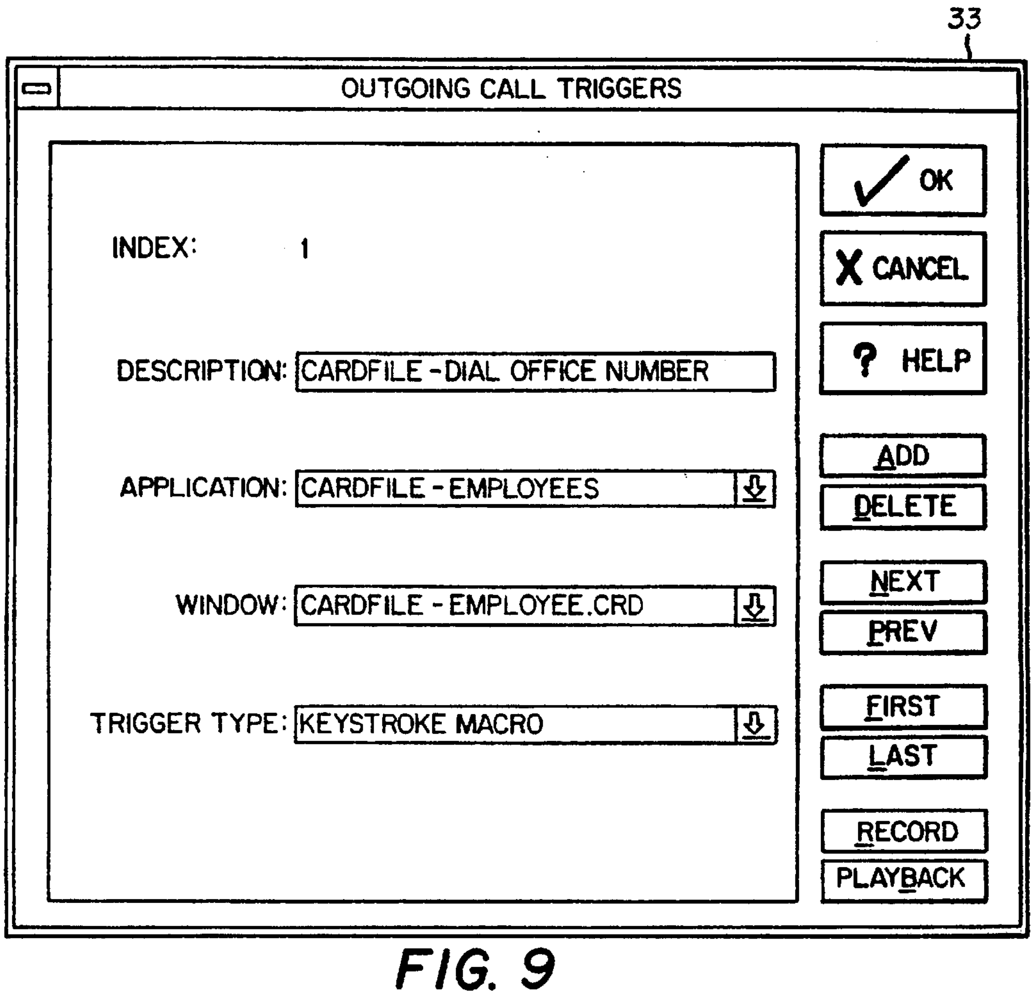
FIG. 9 is a view of a screen for creating outgoing call triggers according to the set-up routine of FIG. 2.

For each window, step 28, the user types in the commands required to retrieve a screen or record based on call information from the telephone system, as extracted by the switch interface 14 and platform 16, FIG. 1. This command string, entered in screens 31 and 33, FIGS. 8 and 9 is then stored and referred to as a "trigger".

Figure 2:
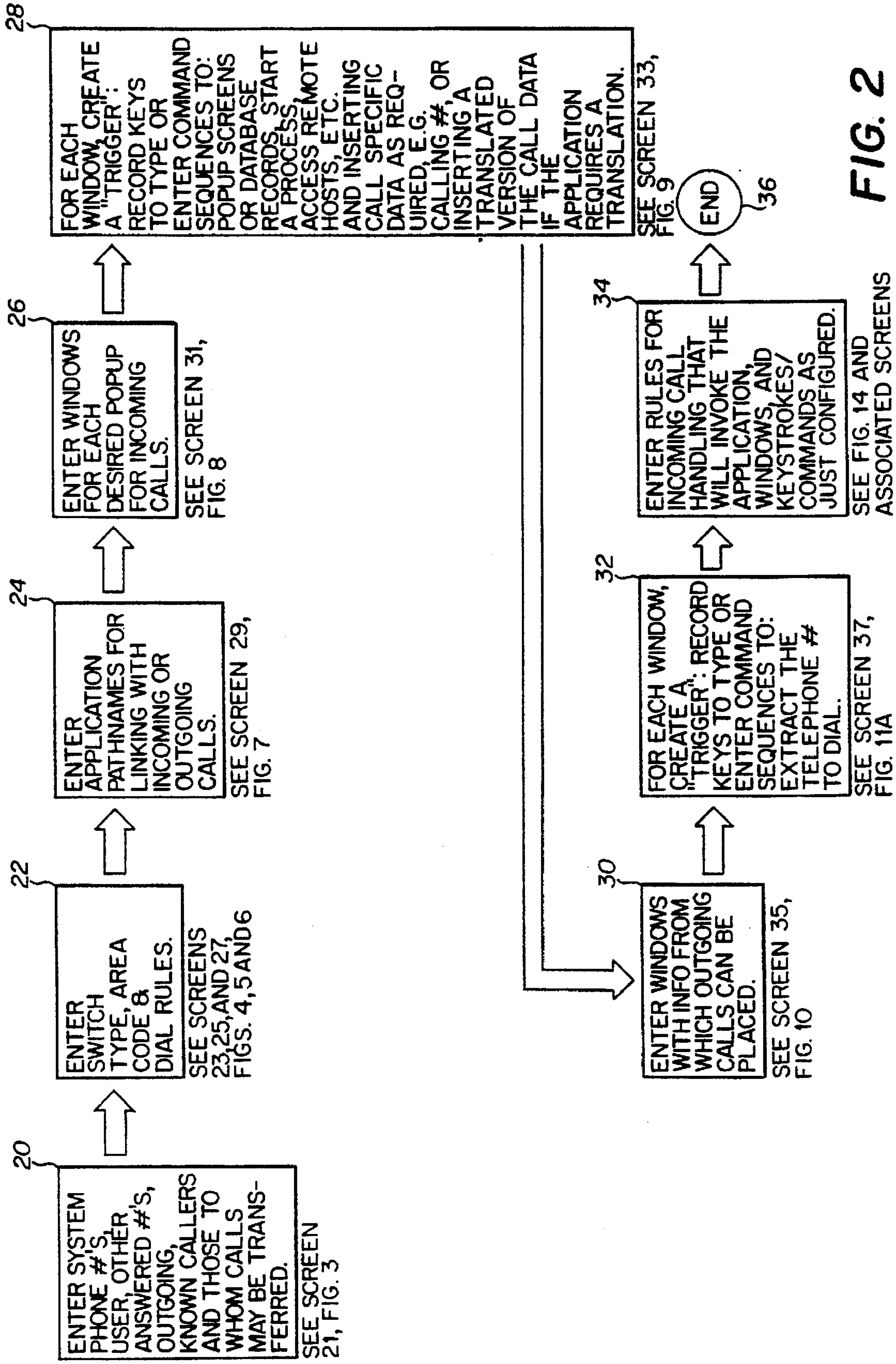
FIG. 2 is a block diagram of a set up routine for uniformly configuring the computer-telephone integration system of FIG. 1 to access different application programs according to this invention.

Returning to the previous example, the university employee enters the telephone numbers of the administrative office in step 20, FIG. 2. After establishing the switch type, area code, and dial rules, step 22, he then enters the names of the grade and financial aid database application programs and the charitable contribution spreadsheet application program, step 24. For the database program, he enters the grade window and the financial aid window and for the spreadsheet programs he enters the charitable contribution window, step 26. For each window, he enters the commands required to retrieve a screen by telephone number. There may be one command string required to retrieve the grades of a student by phone number and another command string required to retrieve the financial aid information of a student by phone number. And, there may be a different set of commands required to retrieve charitable contribution information from the spreadsheet application program based on a callers phone number.

But, having previously worked with these application programs, the user knows these commands and enters them in step 28, FIG. 2. Middleware program 18, FIG. 1, then records these commands and will automatically repeat them later upon receipt of an incoming call. Note that the system is easily configured without the need for computer programmers or individual programs created for each application.

Figure 10:
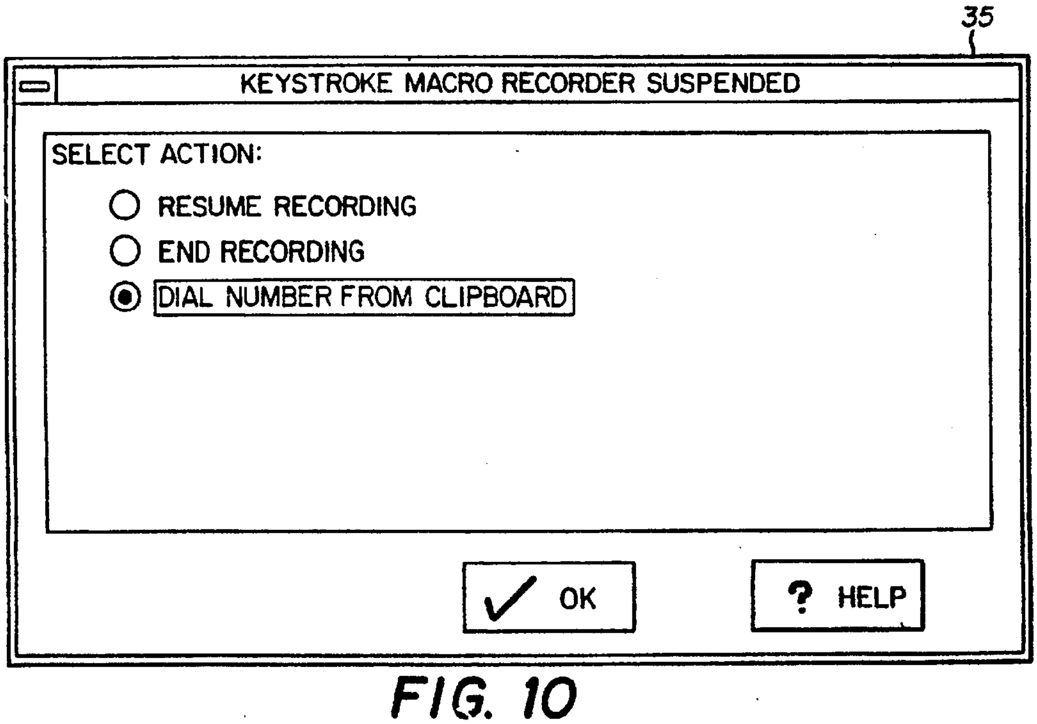
FIG. 10 is a view of a screen for entering windows for outgoing calls according to the set-up routine of FIG. 2.
Figure 11:
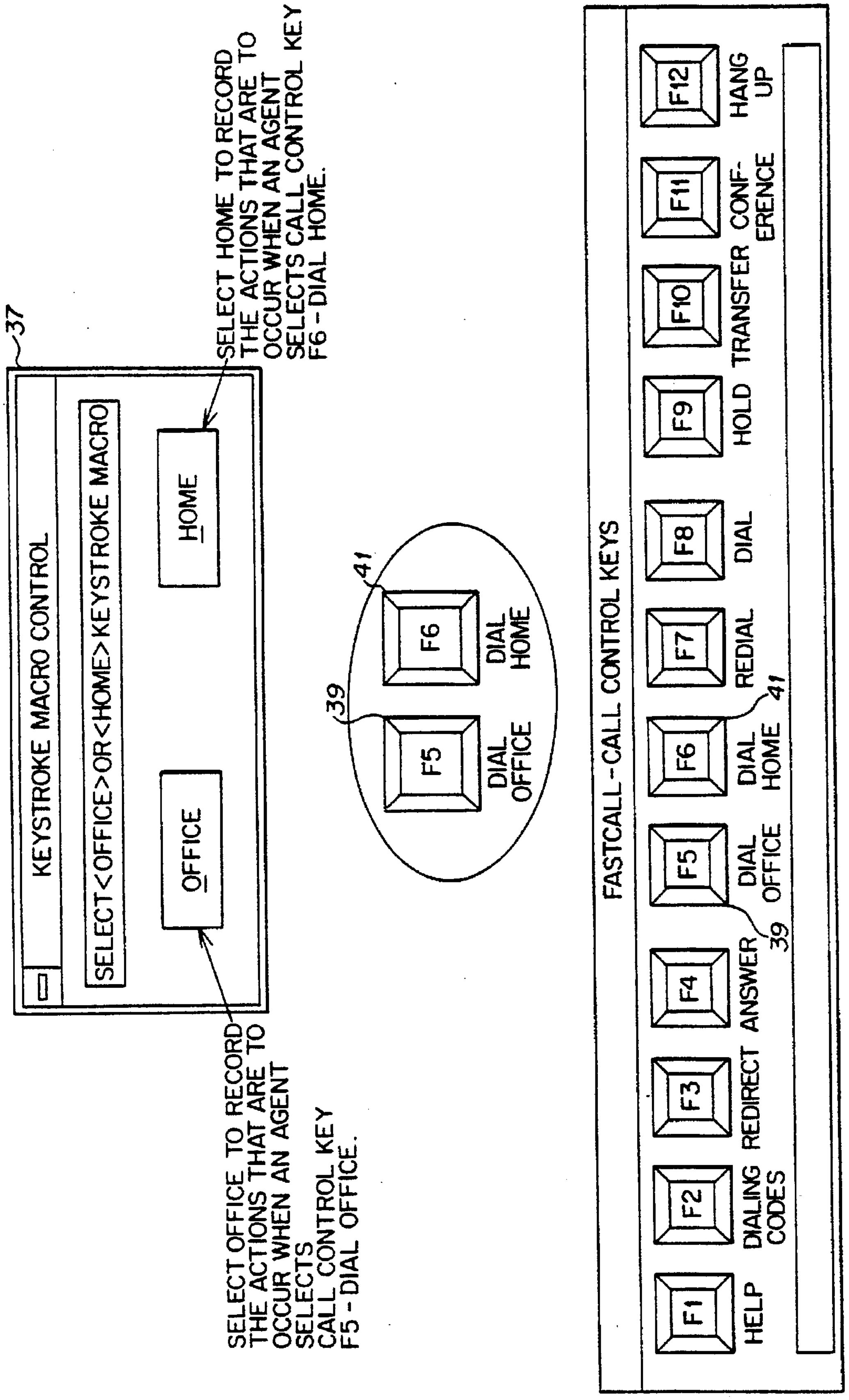
FIG. 11 is a view of a screen and associated control function keys for extracting outbound dialing numbers.

A similar process is performed for outgoing call automation. The windows are entered from which outgoing calls can be placed, step 30, FIG. 2. See screen 35, FIG. 10. For each window, step 32, FIG. 2, the user creates a trigger as with incoming calls and then types the commands required to extract two telephone numbers, e.g. home and office, and pass them on to the middleware layer for outbound dialing. See screen 37, FIG. 11. Rules are then entered, step 34, for incoming call handling that will invoke the application, windows and keystrokes/commands as just configured. When this is completed, the process ends, step 36, FIG. 2. Control keys 39, 41, etc., FIG. 11 assist in making these selections quickly.

This process is repeated for each application and after this set-up routine is completed, the system is uniformly configured to access all the user's application programs and retrieve data in response to call information. When a telephone call is received on the telephone system, FIG. 1, an applicable rule may be executed as shown in the routine shown in FIG. 12.

Incoming Call Processing

Figure 12:
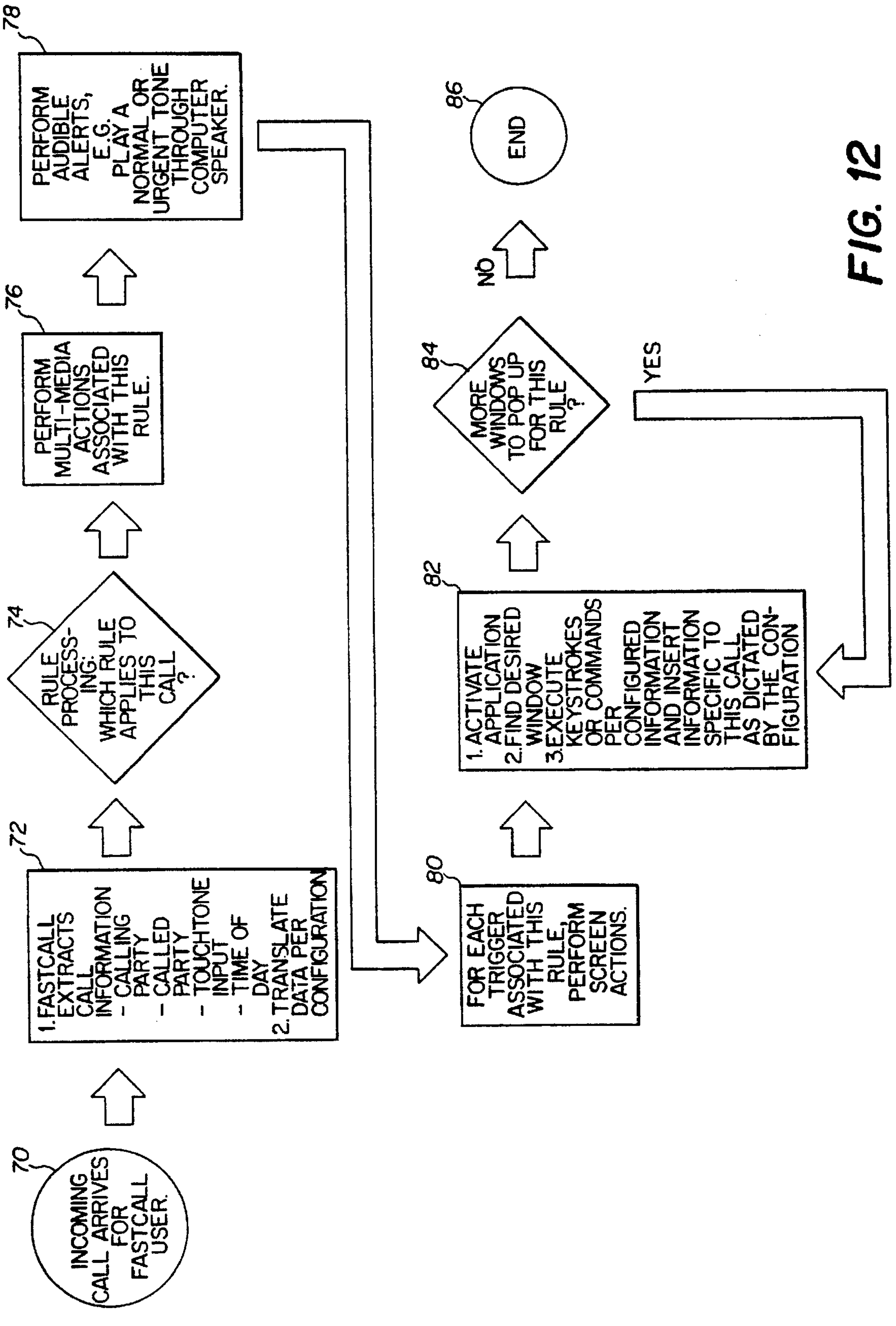
FIG. 12 is a block diagram of incoming telephone call processing according to the computer-telephone integration system of this invention once the set-up routine of FIG. 2 is accomplished.

After a call arrives, step 70, FIG. 12, call information is extracted, step 72, such as the caller's telephone number. A determination is then made as to which rule applies to the incoming call, step 74, the appropriate multi-media actions associated with the rule are performed, step 76, audible alerts are performed, step 78, and each trigger is activated, step 80. This activates the appropriate application, step 82. If more windows are accessed, step 84, processing returns to step 82, otherwise processing for this call ends, step 86. The application is automatically retrieved, and the correct window is activated automatically since middleware program 18, FIG. 1, enters the previously recorded commands and inserts the call information as required upon receipt of an incoming call. In essence, the user who knows how to access the various application programs on his/her system teaches middleware program 18 once how to retrieve the application programs in response to an incoming call and thereafter middleware program 18 automatically processes incoming calls.

So, for example, upon receipt of an incoming call step 70, FIG. 12, from a student, her telephone number is extracted, step 72, and the appropriate rule is invoked, step 74. The database application program is retrieved, step 82, and the grades (and/or financial aid) window is activated. Middleware program 18, FIG. 1, then automatically enters the previously recorded command string (step 28, FIG. 2) and inserts the extracted student phone number at the correct place in the command string. The telephone number, extracted from the switching device including board 14 and drivers 16, FIG. 1, is then inserted at the correct place in the command string to retrieve the grade information data for the particular student calling the administrative office.

Or, if an individual calls and requests information on making a charitable contribution, his phone number is extracted and a different rule is invoked, step 74, FIG. 12. The spreadsheet application program is retrieved, step 82, the correct charitable contribution window is activated, and the middleware program enters the correct spreadsheet commands to retrieve the callers charitable contribution information based on his phone number.

In this way, the user was not required to individually program computer 10, FIG. 1, to handle incoming calls based on the many possible different command sequences required to pull files and data from different application programs. The user is only required to "teach" middleware program 18, FIG. 1, what she already knows, namely the commands for each application program, and thereafter the program remembers the commands and correctly processes all future incoming calls.

Figure 13:
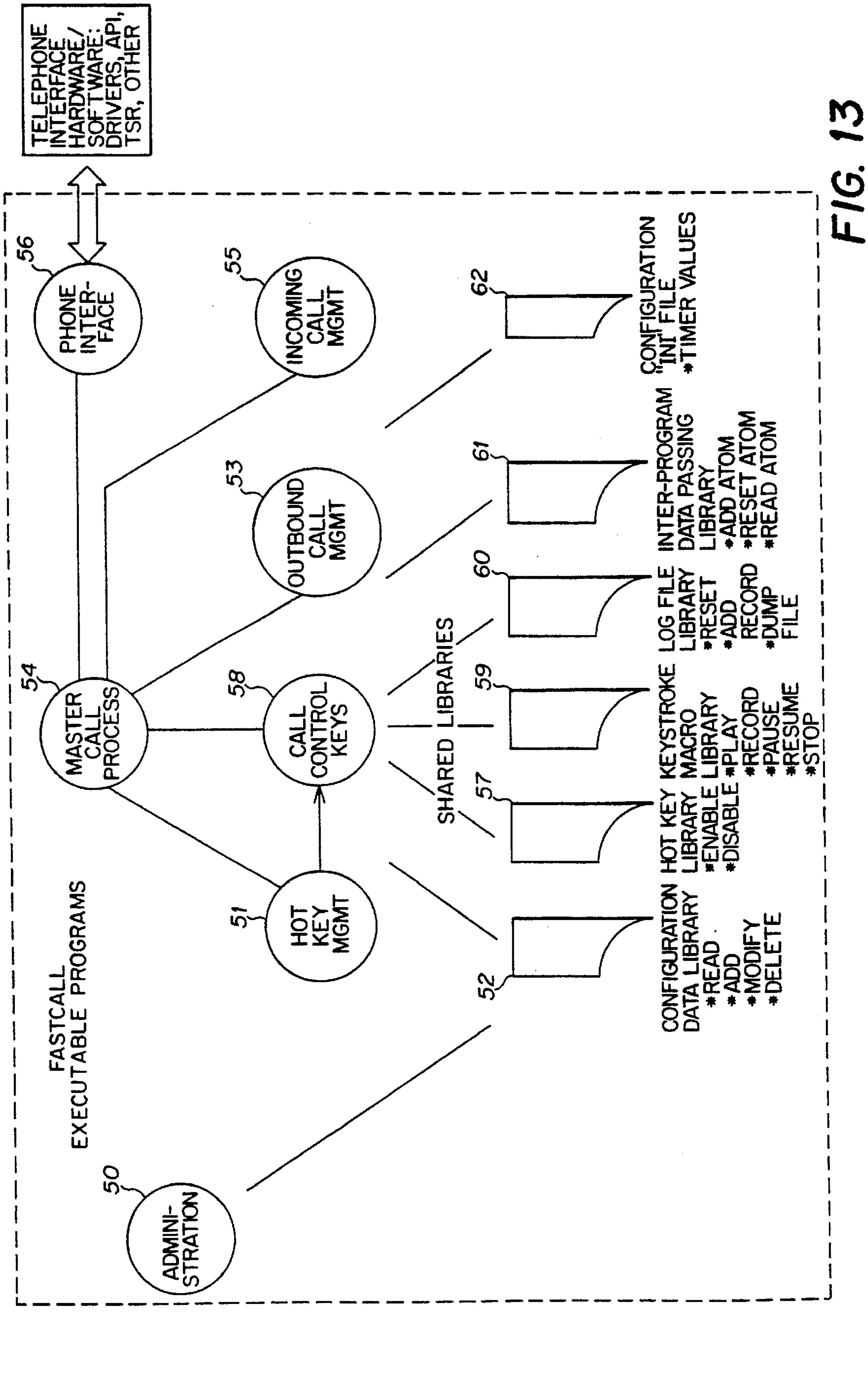
FIG. 13 is a block diagram of the relationship between the executable programs and the libraries of the computer-telephone integration system according to this invention.

The set up routine depicted in FIG. 2 is contained in a stand alone executable program. The entire software of the invention is depicted in FIG. 13, where the set up routine 50 is labeled "administration". The actual data configured in the setup routine is stored in a set of binary files. The command sequences, or "triggers" are stored in specially identified macro files that may be updated whenever the user re-records a new commands sequence for a specific application window. Many other configuration parameters, such as system telephone numbers, various user modes, local area code, etc. are stored in files as well, and are accessed as required during the processing of incoming and outgoing calls through the middleware. As setup information is entered by either the user or a site-wide administrator, this information is stored via the use of dynamic library commands, such as "add trigger", "delete trigger", "add rule", "modify rule", etc., as depicted by the Configuration Data Library 52. This library is then accessed by other programs 53–56 and 58 and libraries 57 and 59–62 that handle the call-by-call-processing, via commands such as "read trigger", "read rule", "read call numbers", etc., The function of the library is to provide a consistent way for multiple programs to simultaneously access the configuration files for reading, writing, or modifying.

If multiple applications or a variety of call handling scenarios are desirable, it may be necessary to establish and implement a set of rules for processing incoming calls. For example, student calls on one telephone number may be put through only during certain time periods when they invoke a financial aid database to pop-up on the user's screen, while telephone calls from wealthy individuals seeking to make charitable contributions would always be handled immediately and would invoke the charitable contribution spreadsheet. Establishing and implementing these precedential rules is described in more detail below.

Establishing Precedential Rules

Figure 15:
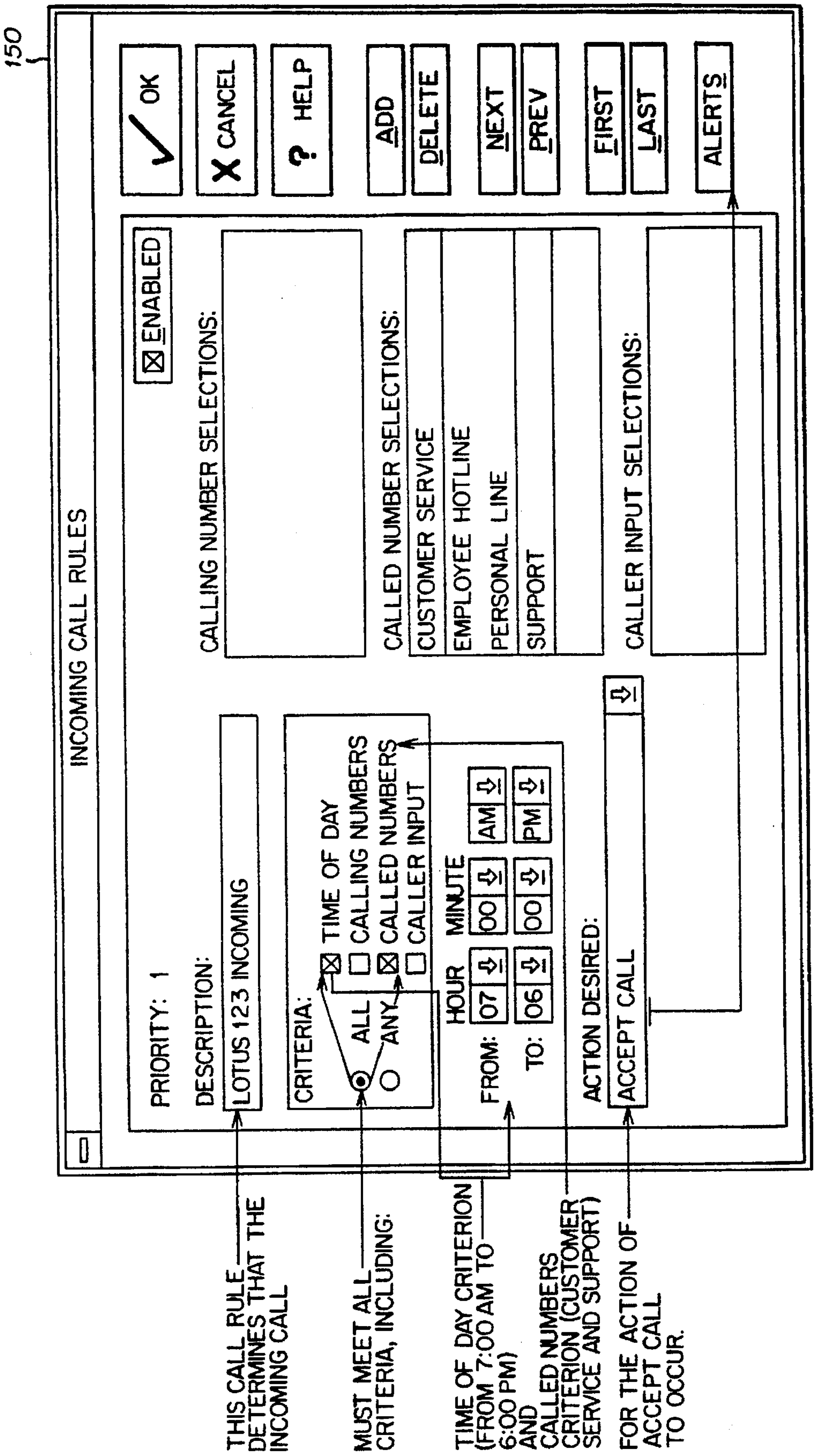
FIG. 15 is a view of a screen for establishing incoming call precedential rules according to FIG. 14.
Figure 16:
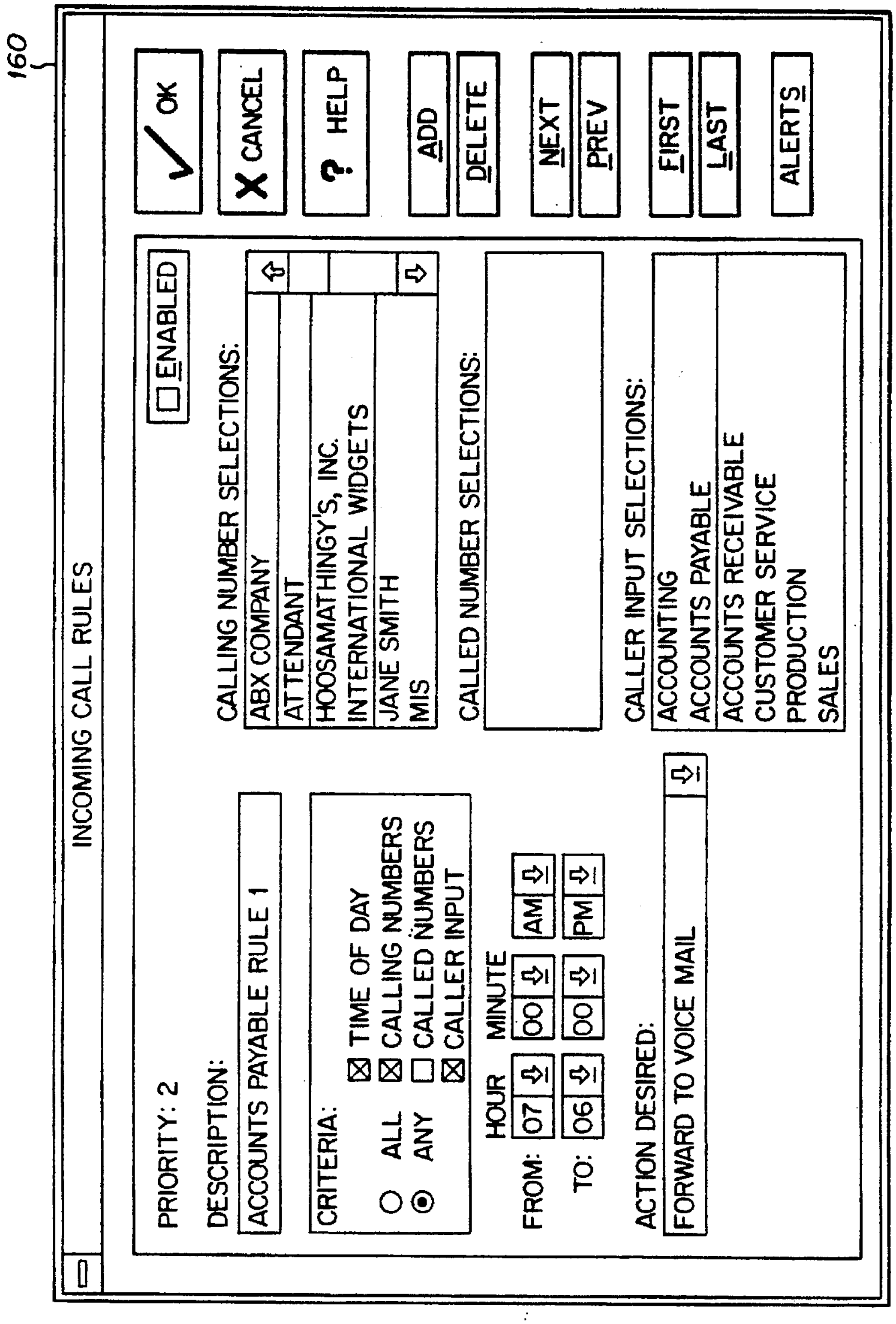
FIG. 16 is a view of a screen for entering a call forwarding rule according to FIG. 14.
Figure 17:
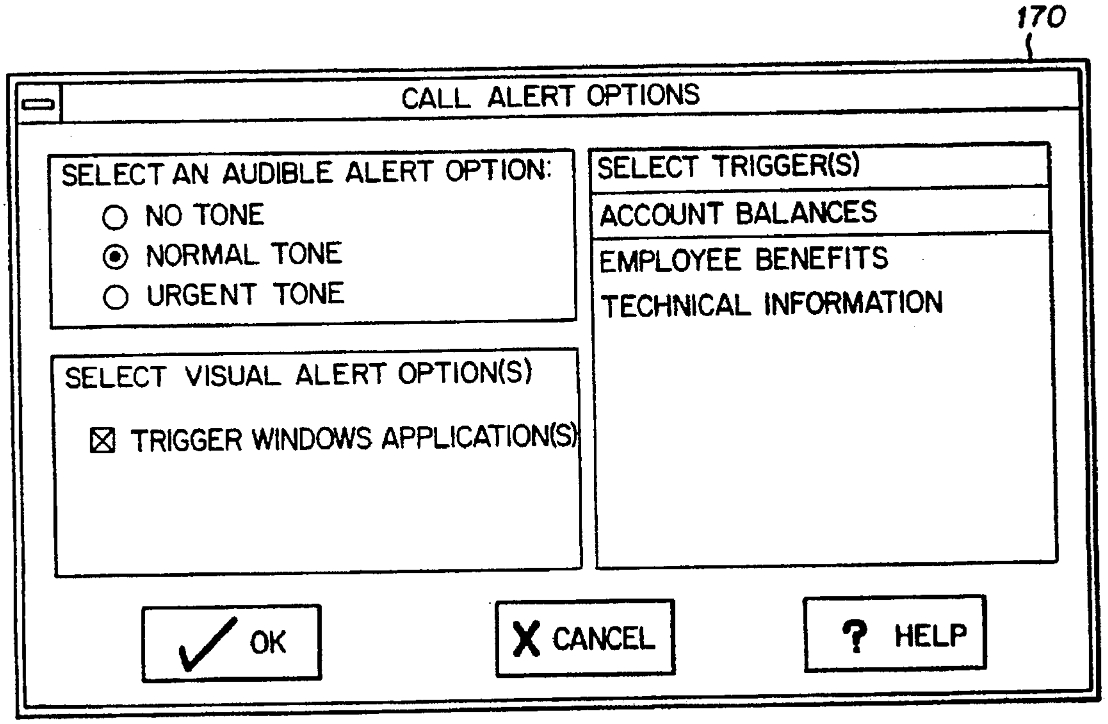
FIG. 17 is a view of screen for selecting call alert options.

The call processor for establishing and executing precedential rules according to this invention is described below. Once a decision is made to add, modify or delete incoming call rules, step 120, FIG. 14, the priority handling rules are established in order of priority as shown in step 122 for the first rule, step 124, and the priority is set to the number of the rule being established. See screens 150 and 160, FIGS. 15 and 16. The user enters the call information, step 126, FIG. 14, and then enters the rule handling criteria. For example, the time of day, the calling numbers, the called numbers, and/or caller input may form the criteria of the call handling rule to be established. The user enters the action desired, step 128. If the action desired is to accept the call, the user specifies the desired sound tone the computer will emit step 130, as shown in screen 170, FIG. 17 and then selects the "trigger". This trigger, step 132 denotes which application program, window, and associated command sequence should be invoked for the call information chosen. If the action desired in step 128 is not to accept the call, the user specifies the forwarding number, step 134, also shown in screen 160, FIG. 16, plus an optional trigger. If there are more rules to perform after step 132 or 134, the process, in step 136, returns to step 124. If no more rules are to be performed, the process ends, step 138. All this information is stored, and the user then establishes the rule next in priority, step 124, FIG. 14.

The priority based rule sub-system used by the invention is based upon a boolean expression evaluation of specific criteria that an incoming call must meet. If an incoming call's information satisfies the criteria of a rule, that rule is executed. The rules are evaluated in a priority order, so that only the highest priority rule satisfied is executed. Rules are processed at various times during a call based upon user configurable modes, e.g. before a call is answered, as a call is answered, upon a user action, etc. Rules may be processed more than once for each call, as more information about the call is transmitted by the telephone switching device. This is particularly useful for calls that are transferred from one party to the user of the invention, in that when the transfer is completed, the information about the original call as well as the transferred party is transmitted to the invention, so that further computer commands, or triggers may be executed based upon this new information.

Figure 14:
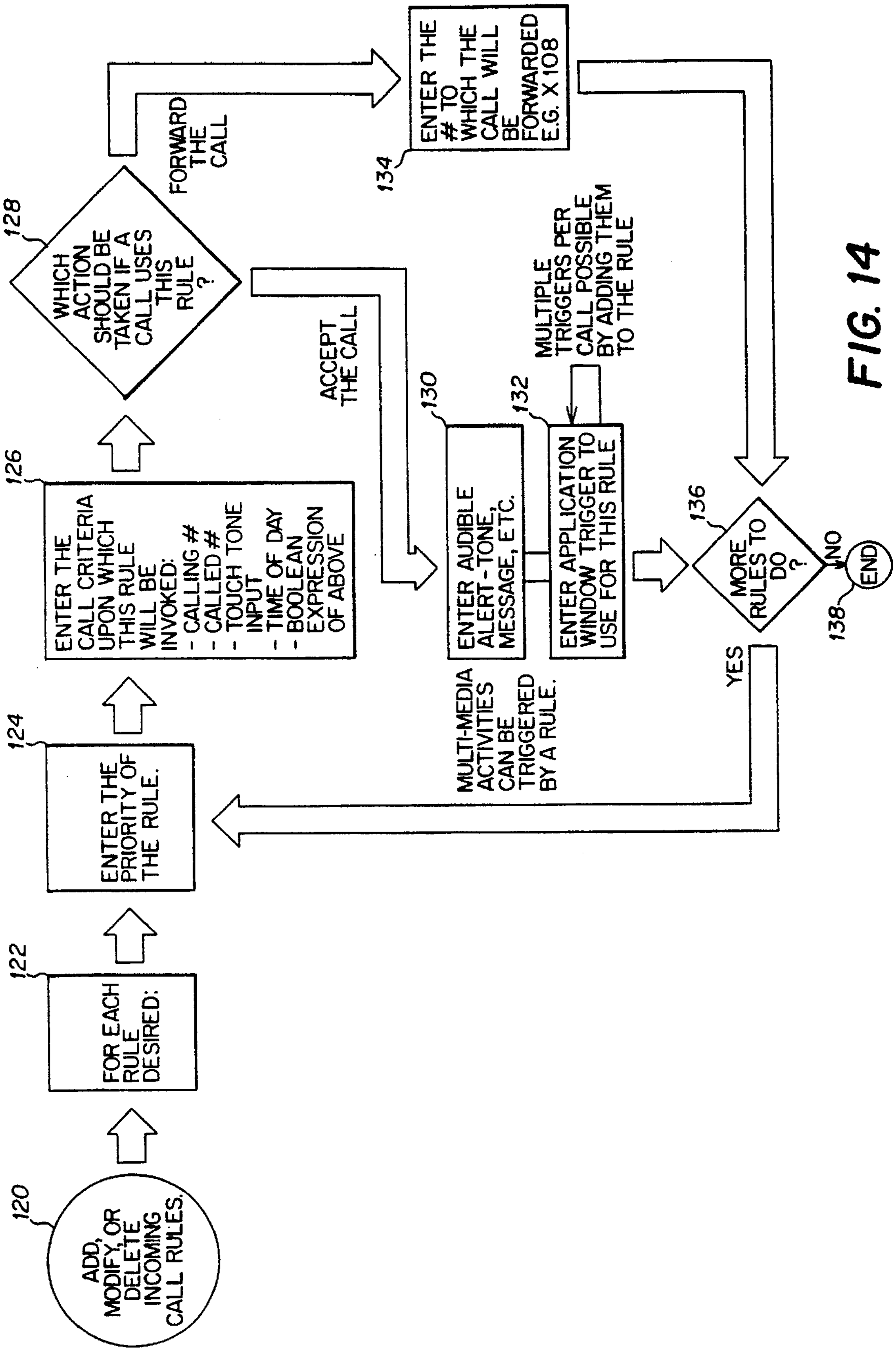
FIG. 14 is a block diagram of the routine for uniformly establishing precedential rules for the computer-telephone integration system of this invention.

The criteria for the call may be based upon several pieces of information, including the calling party's number (or a translation of this number), the number dialed by the caller (or a translation of this number), touch tone input keyed in by the caller (or a translation of this number), and/or the time of day. A combination of multiple selections of the numbers and a time of day range may be specified in a boolean expression that requires "ALL" of the criteria to be met, i.e. if calling and called numbers are specified, then both must be matched for the rule to apply, or "ANY" of the criteria to be met, i.e. if calling and called numbers are specified, if either numbers are matched, then the rule applies. Extensions of the boolean expression to use are anticipated by the invention. FIGS. 14, 18, and 19 detail the rule process used by the invention, in increasing levels of detail. FIGS. 18-19 describe how the software actually handles a call and determines which rule applies, if any, for a given incoming call.

In step 200, FIG. 18, an incoming call arrives to the system. Information is passed to the system or is queried by the system from the telephone device. This information includes one or more of the following elements: calling number, called number, caller input (touch tones dialed by caller), and time the call was received.

The invention then enters a software loop, the purpose of which is to determine which, if any, of the predefined call rules applies to this particular call (step 202). Call rules may be dynamically enabled or disabled by the user, so that the loop is only processed for currently enabled rules, permitting temporary changes in call flow handling. In step 204, the call information is matched against the criteria (206) entered for the next highest priority rule (more detail on this is described below in association with FIG. 19). If a match is not found for this rule (step 210), the loop is continued and the call information is matched against the next priority enabled rule, until all enabled rules are exhausted. If a match is found (step 208) then the loop is exited, and the action specified by the rule is taken. This action can either be to forward the call to an alternative telephone number (NOT accept the call) as in steps 214, 216, or the action can be to accept (answer) the call as in step 212. If the call is accepted, then various activities occur; this invention anticipates general multimedia activity to result here, e.g. the playing of various predefined sounds, voice messages, etc, through the computer (step 220, 218), to the user (step 222), the triggering of application screens and commands that perform computer functions based upon the current call information (step 224).

FIG. 19 provides more detail on how the incoming call rules process works. In step 250 the incoming call is received and detected in the software of the invention. Call information associated with the call is listed in box 252. In step 254, the software loop counter is set to 1, which means to search the rules in priority order, to find a match with the current incoming call, with rule number 1 corresponding to the highest priority rule, rule number 2 being the second highest priority, etc. In step 256, the process to match the call information against the next rule's criteria is begun. The criteria consists of a boolean expression of zero or more the following elements: time of day, calling number, called number, and caller's touch tone input. The boolean expression can either be a logical AND of these elements, or a logical OR of these elements. Each rule can specify zero, one, two, three, or all four of the elements to be a required match, i.e. the time of day is a required part of the criteria, the calling number is a required part of the criteria, etc. If a logical AND is selected for the boolean expression, then all of the required criteria elements must contain a match to the current call for the rule to apply (i.e. match as a whole). If a logical OR is selected for the boolean expression, then if any of the required criteria elements match the current call, then the rule should apply.

The process of matching call criteria elements is described in step 258–294. In step 258, the invention determines if the rule the call information is being matched again has time of day as a selected required criteria. If not, processing proceeds to the next criteria step 270. If time of day is a required element, then the current time is matched against the time of day range entered in the rule to determine if the current time fails within the range specified step 260. If it does not step 268 and the boolean expression setting is AND, the rule will not apply, and the program proceeds to the next loop counter (next highest priority rule) to see if there is a match, step 266. If there are not more rules, the program terminates and no action is taken. If the time range does not match and the boolean expression is OR, then the rule may still apply, so processing continues with matching the next criteria element (calling number) in step 270. In step 262, if the current time does fall into the specified time range and the boolean expression setting is OR, then the rule is matched, step 264 and the multimedia actions specified in the rule are taken by the invention as described above. If the time range match and the boolean expression setting is AND, then the rule may apply, if other criteria are met, and processing continues with matching the next criteria element (calling number) in step 270.

In step 270, the invention determines whether the current rule specifies a calling number match as a selected criteria. If not, processing continues with matching the next element, called number, step 276. If calling number match is specified, then the current call calling number is matched against the list of selected telephone number identified with this rule, step 272. If there is a match of any of the selected calling number with the current calling number, step 274, then the boolean expression setting is examined. If it is set to OR, then the rule matches, and the multimedia actions for this rule are taken, step 264. If it is set to AND, then this rule may still apply, if all other criteria specified are met, and processing continues with the next element of the criteria (called number) in step 276. If there is no match between the calling numbers selected and the current calling number, step 292, then if the boolean expression setting is AND, this rule is not a match, and processing continues with the next rule, step 266. If the boolean expression is OR and there is no calling number match, then the rule may still be a match if any of the next criteria are a match and processing continues with matching called number is selected, step 276. The same processing for called number and caller touch tone input is done as is with calling number, in steps 276–290 and 294 to determine whether the rule is a match or not. If a match is found, the appropriate actions specified with the rule are taken. If no match is found, the appropriate actions specified with the rule are taken. If no match is found the next rule is examined (in priority order) for a match until no more enabled rules exist, step 266.

All calls go through the rule examination process when the call is first received, when the call is answered, upon user command, or a combination of these, as the user dictates. This provides the user with the ability to determine when and how call-related multimedia events will occur. This invention anticipates extensions to the criteria, boolean expression, and actions which may be specified in each rule. These actions include but are not limited to: popping up a screen or window of information; popping up multiple screens in a specified order; keystroke command emulation using call information or a translation of the information; inter-program communications, such as dynamic data exchange, and application linking; and other forms of scripted commands, potentially a built in call macro language that could launch applications search files for information, etc.

Uniform Configuration For Different Switching Devices

Not all telephone switching devices use the same communication protocols for common telephone functions such as "dial", "answer", "hangup", "hold", etc. Heretofore, the interface between the switching device and the users computer system would be hard coded by those skilled in the computer science arts, but then the users computer-telephone integration system would be switch dependent.

According to this invention, however, a switching device independent state machine for handling the different communication protocols for different telephone switching devices is accomplished as follows.

Figures 21, 21A:
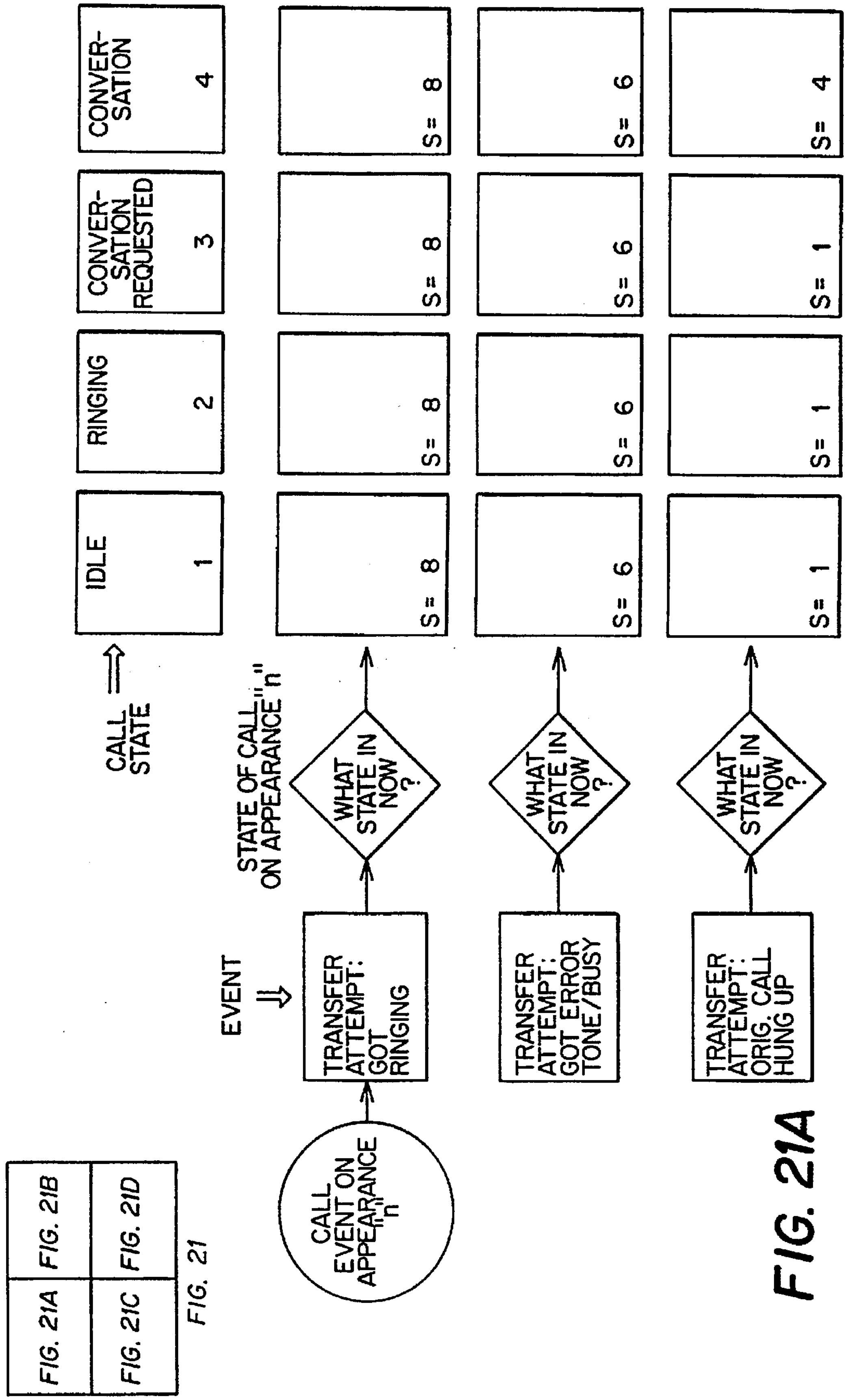
Figure 21C:
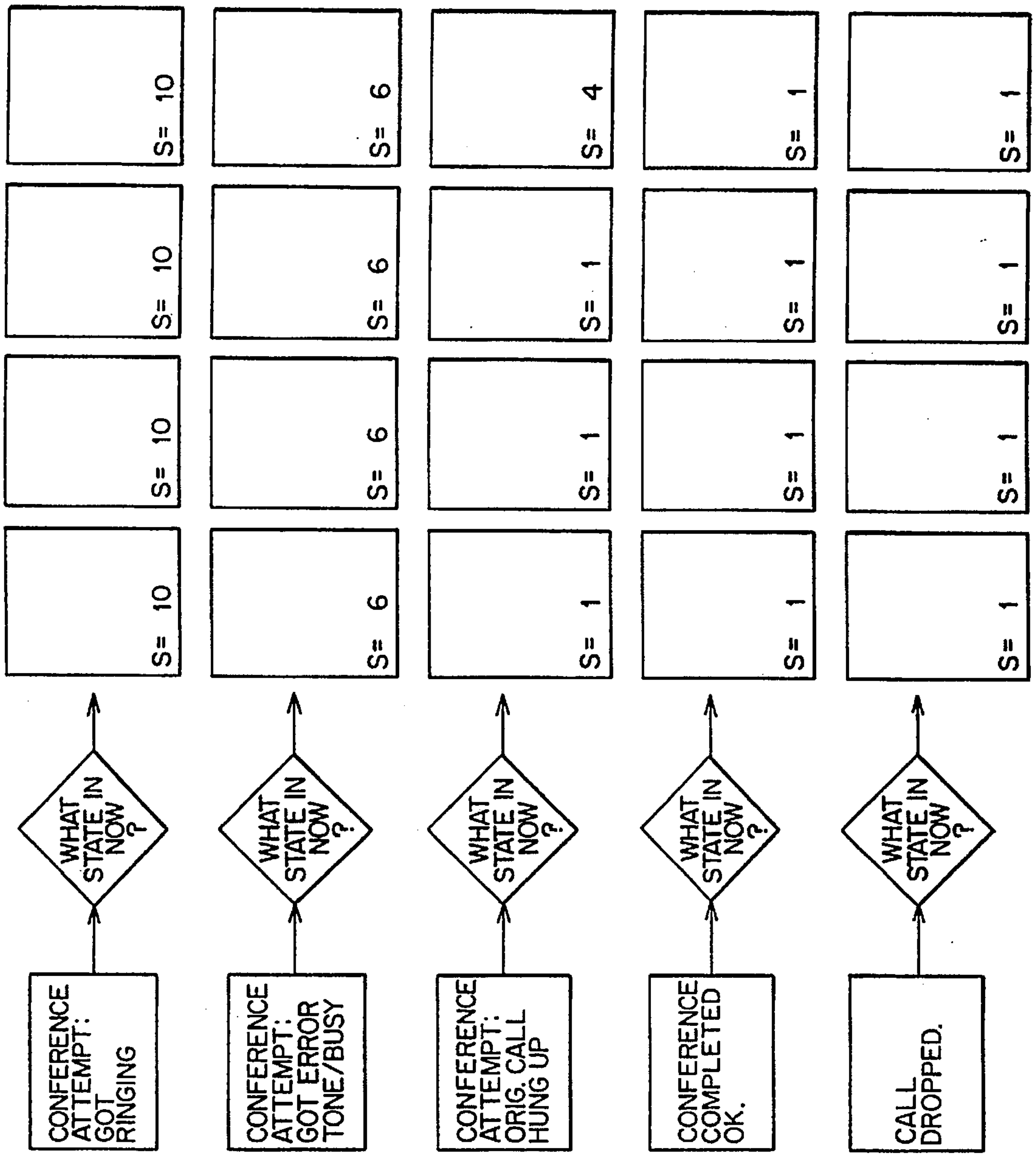
Figure 21D:
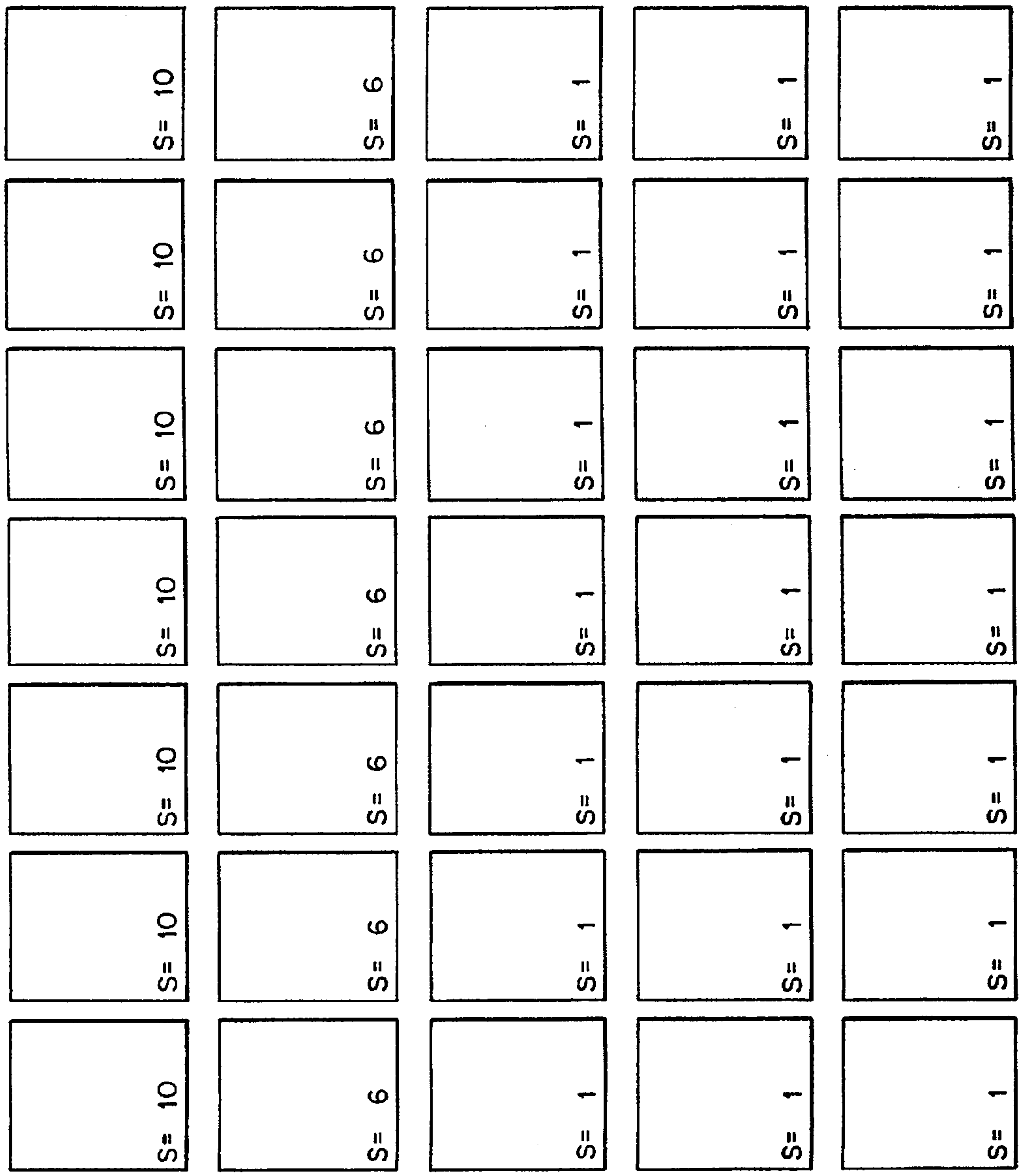
Figure 22A:
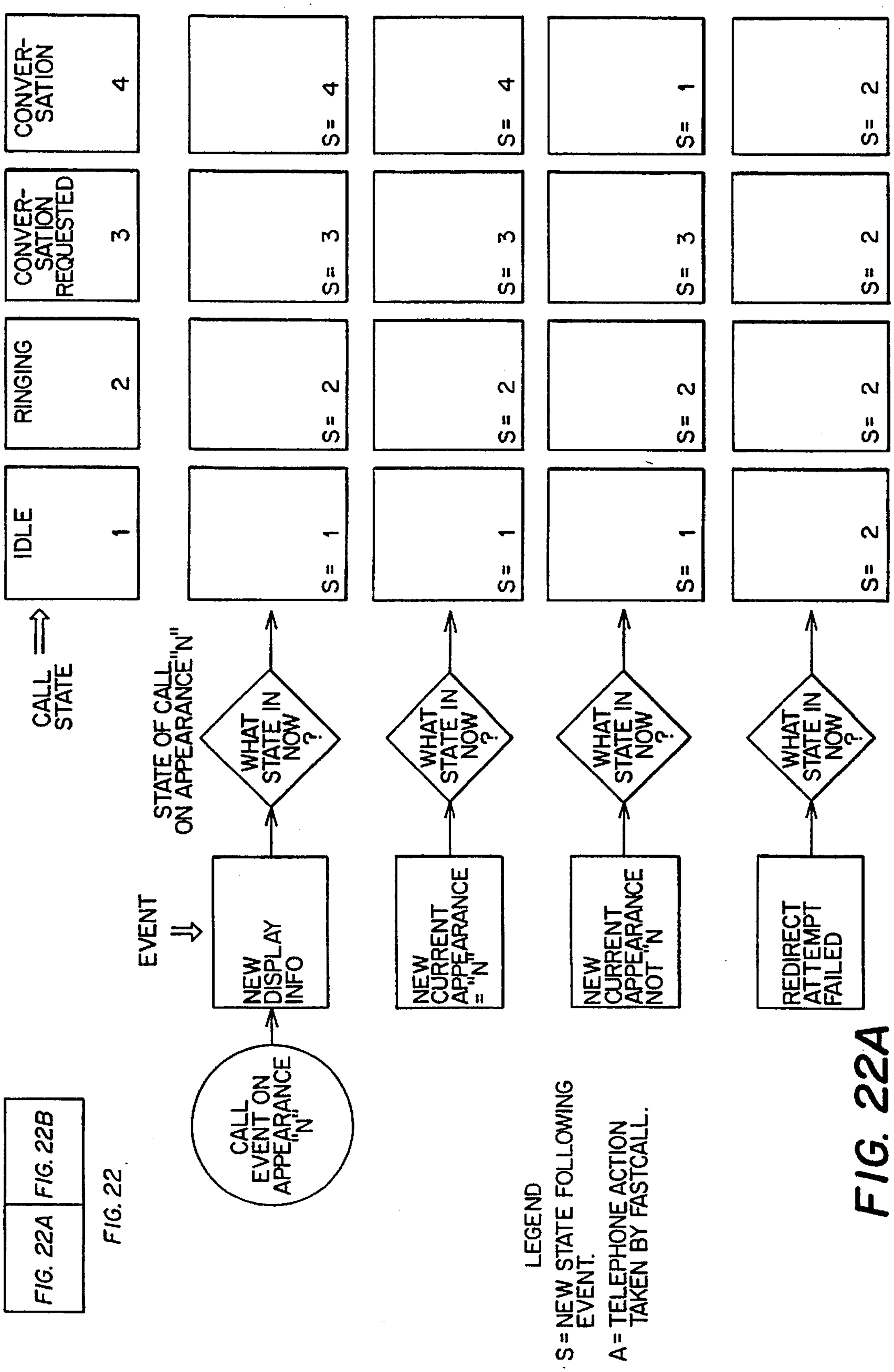
Figure 23:
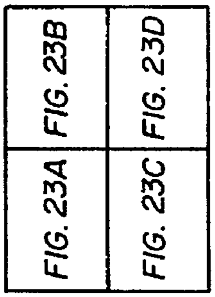
Figure 23A:
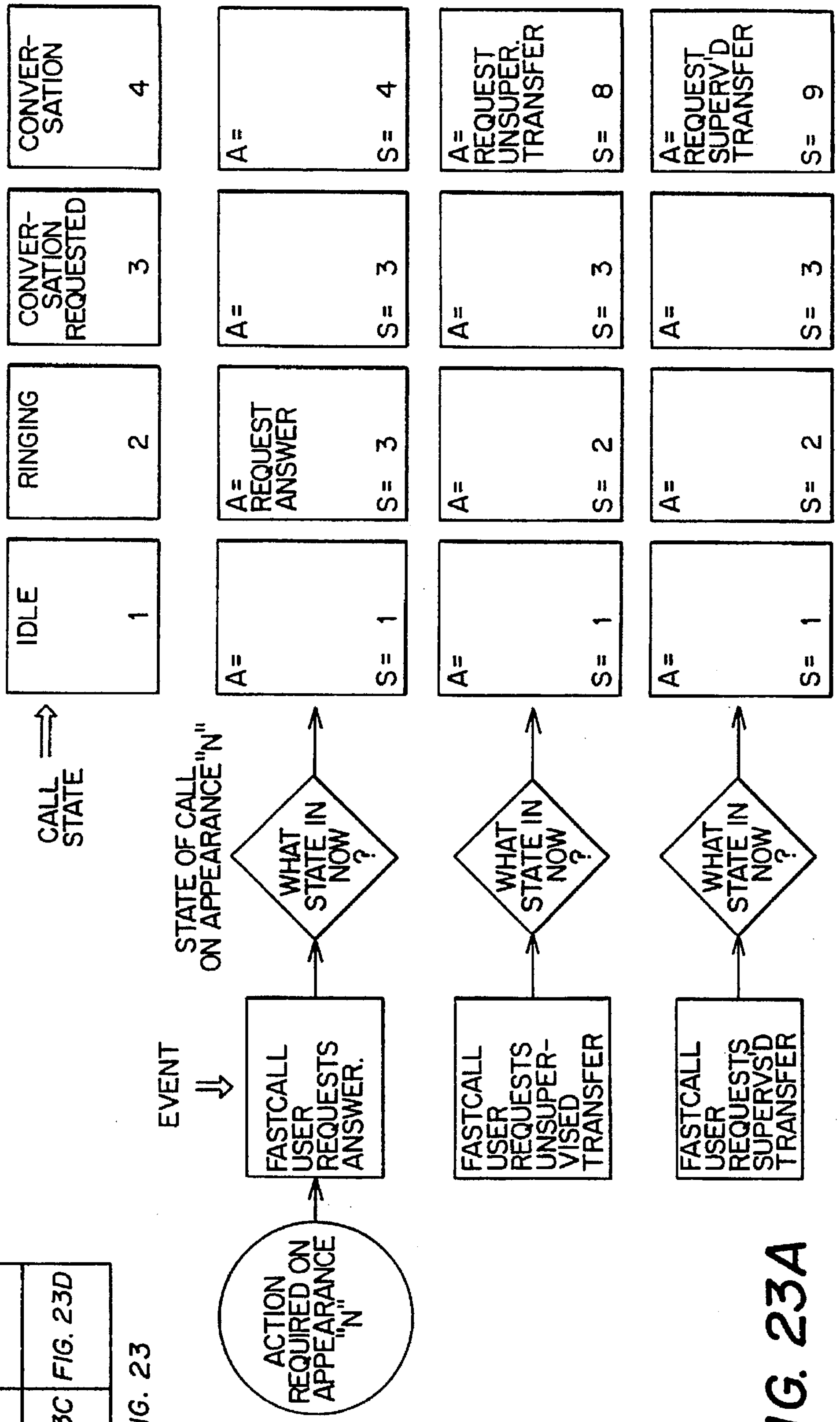
Figure 23C:
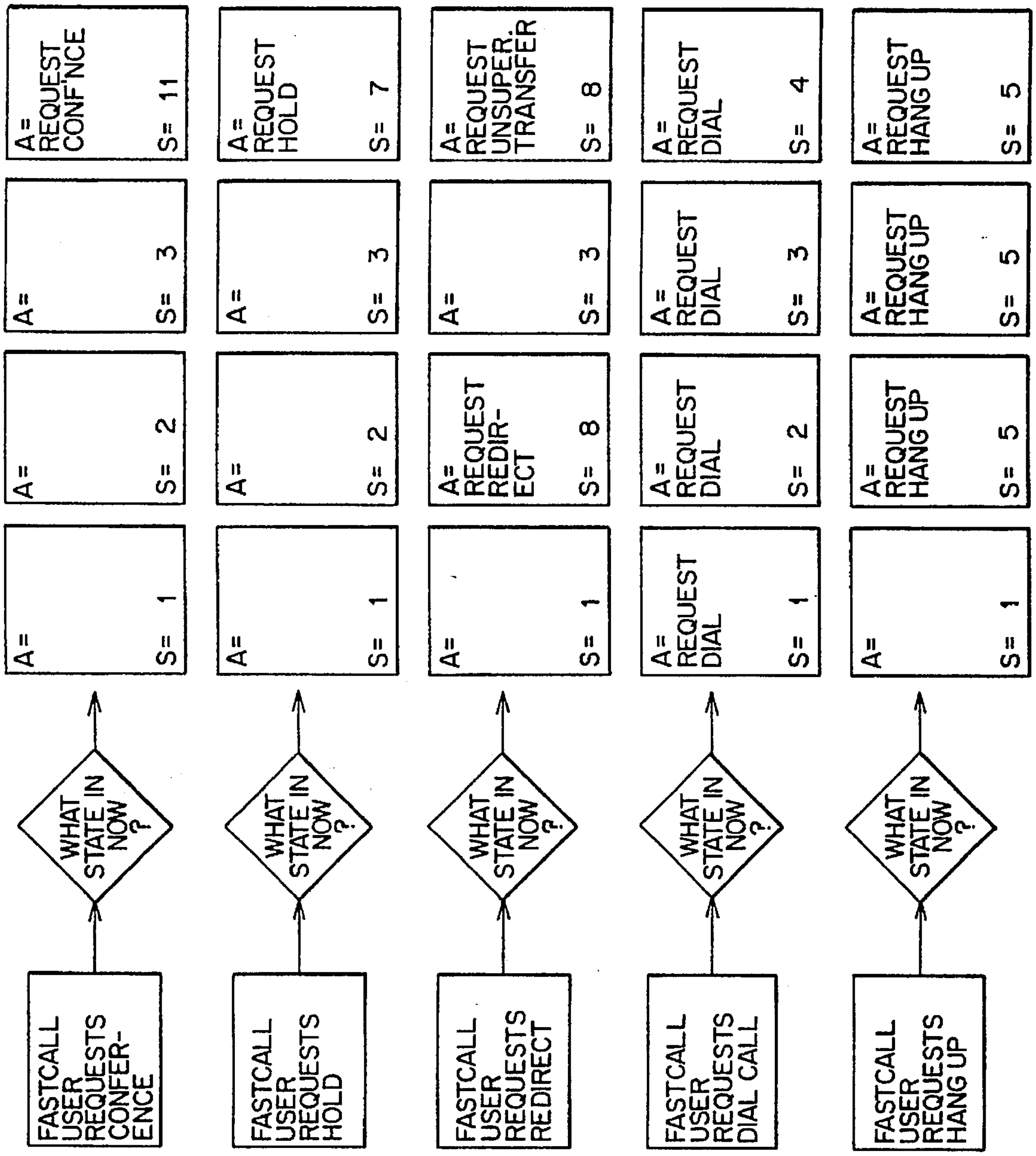
Figure 23D:
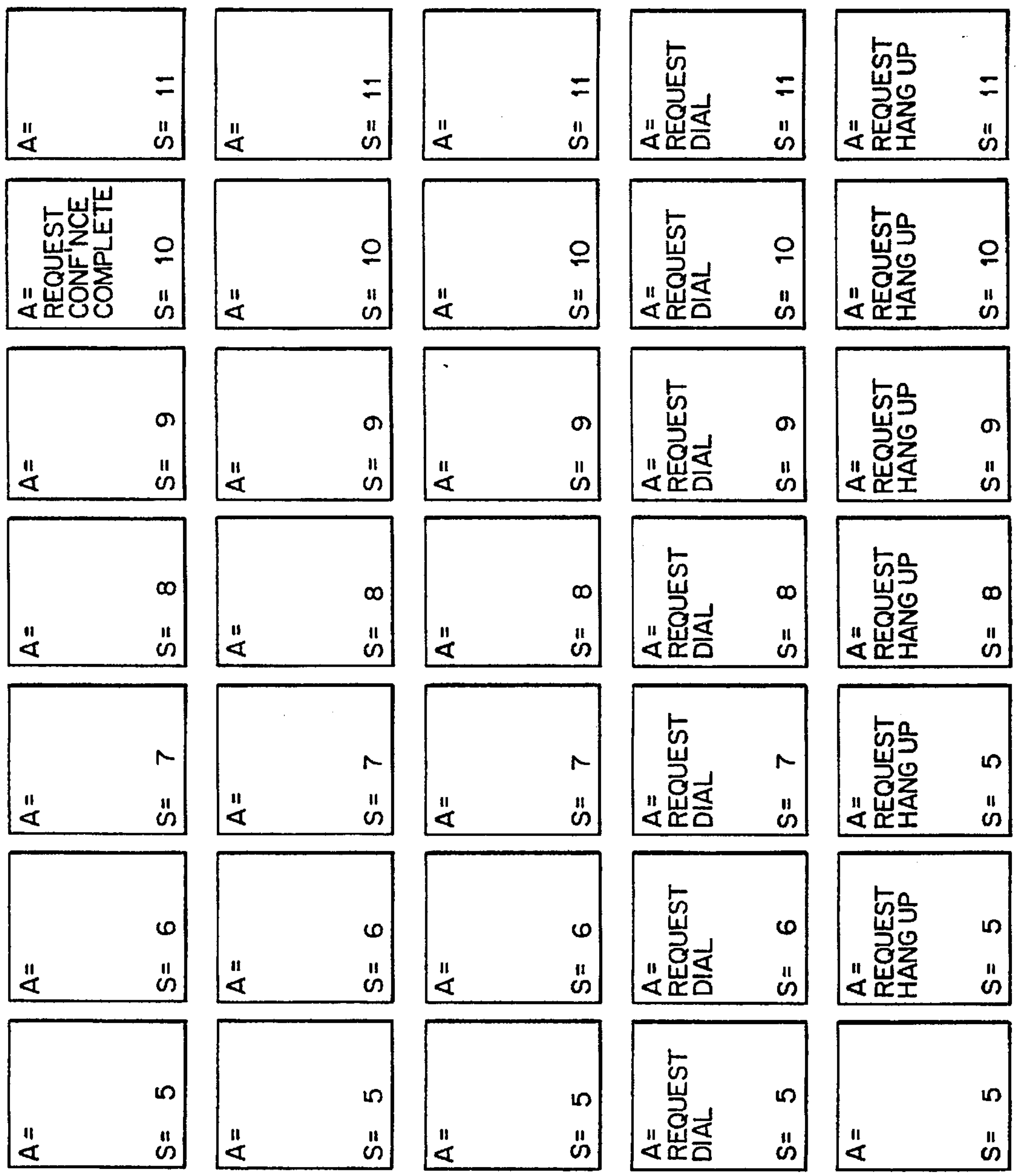

FIGS. 20, 21, 22, and 23 describe the State Machine of the invention. This State Machine is comprised of 11 states that a call (incoming or outgoing) may be in. The states are labeled 1 through 11 across the top of the figures. The columns in the body of the tables define the new state of a call that is currently in the state indicated at the top of the column. This state "S" may change based upon an event described on the left-hand side of the table. These events are one of two kinds: an event generated by and transmitted by the telephone switching device (FIGS. 20, 21, and 22) or actions requested by the user (FIG. 23). These events are represented in the software of the invention by inter-program messages passed between the various software programs of the invention as shown in FIG. 13. The State Machine is embodied in MASTER CALL PROCESS program 54. When an event from the telephone switch occurs, it is first made known to the PHONE INTERFACE program 56, via telephone switch-dependent communications. The PHONE INTERFACE program 56 in turn notifies the MASTER CALL PROCESS program 54 via a uniform; i.e., switch-independent communication, so that the State Machine can perform the approximate actions and change states if required. When user requested events occur, they are first received via the CALL CONTROL KEYS program 58; i.e., the user interface. CALL CONTROL KEYS program 58 in turn communicates the action requests to the MASTER CALL PROCESS 54 for handling and potentially for the transmission of commands to the telephone switching device to carry out the user requests. These commands would be sent by a uniform telephone switch, device-independent communications format from the MASTER CALL PROCESS 54 to the PHONE INTERFACE PROCESS 56, which would, depending upon the type of switching device, send one or more directives to carry out a telephone function request, such as hang up call, dial, etc.

Figure 20:
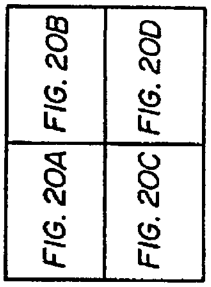
Figure 20A:
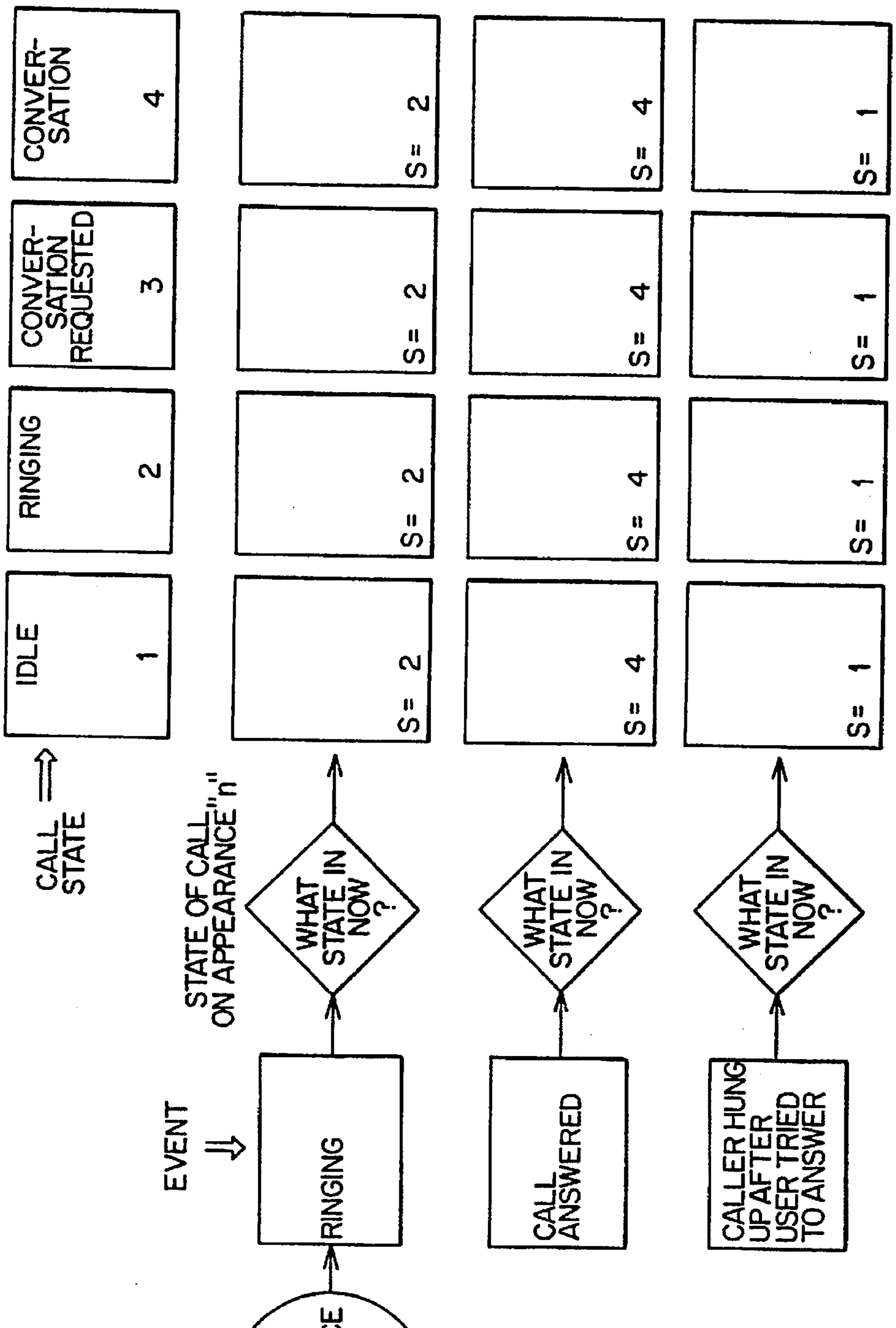
Figure 20C:
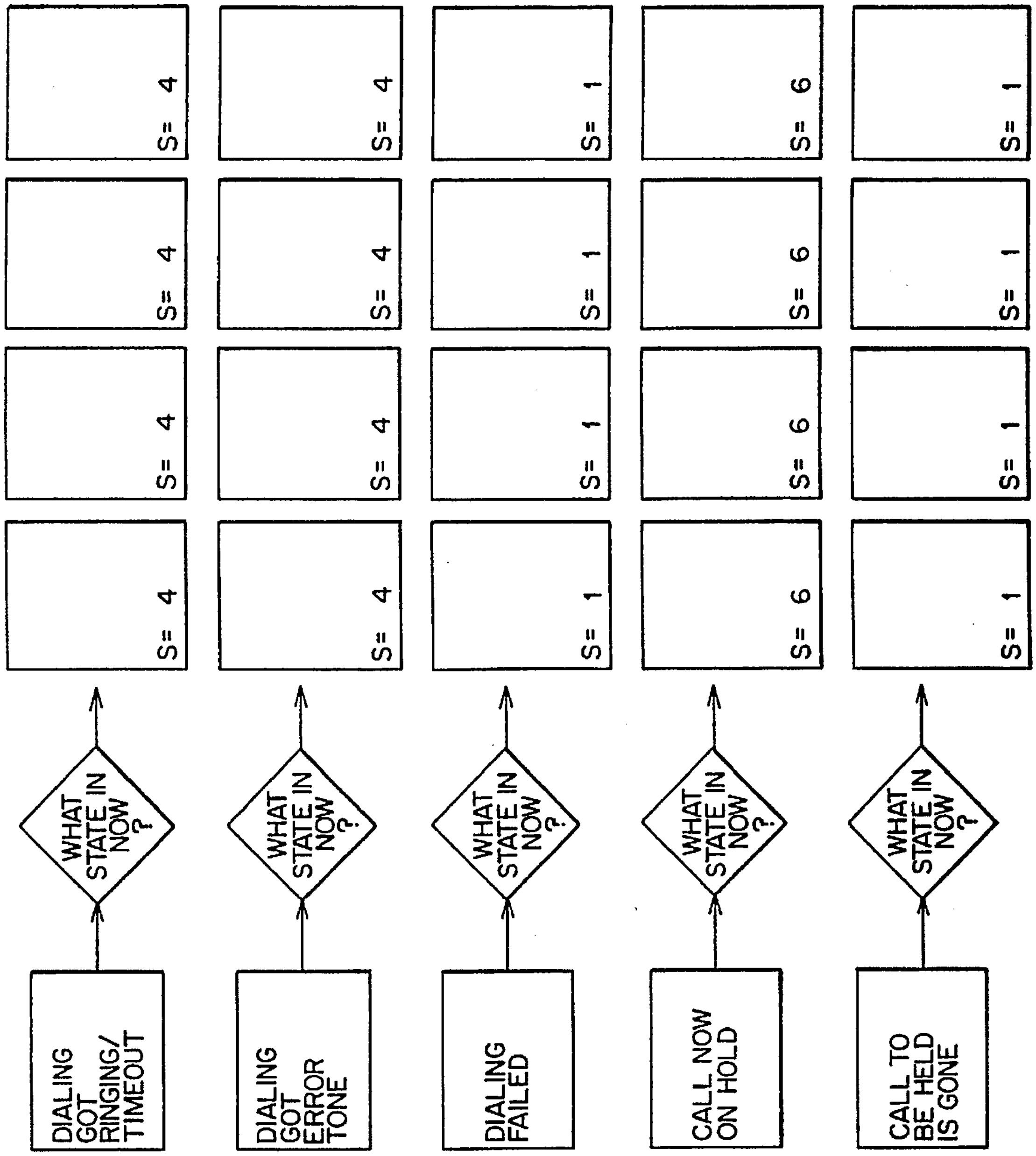
Figure 20D:
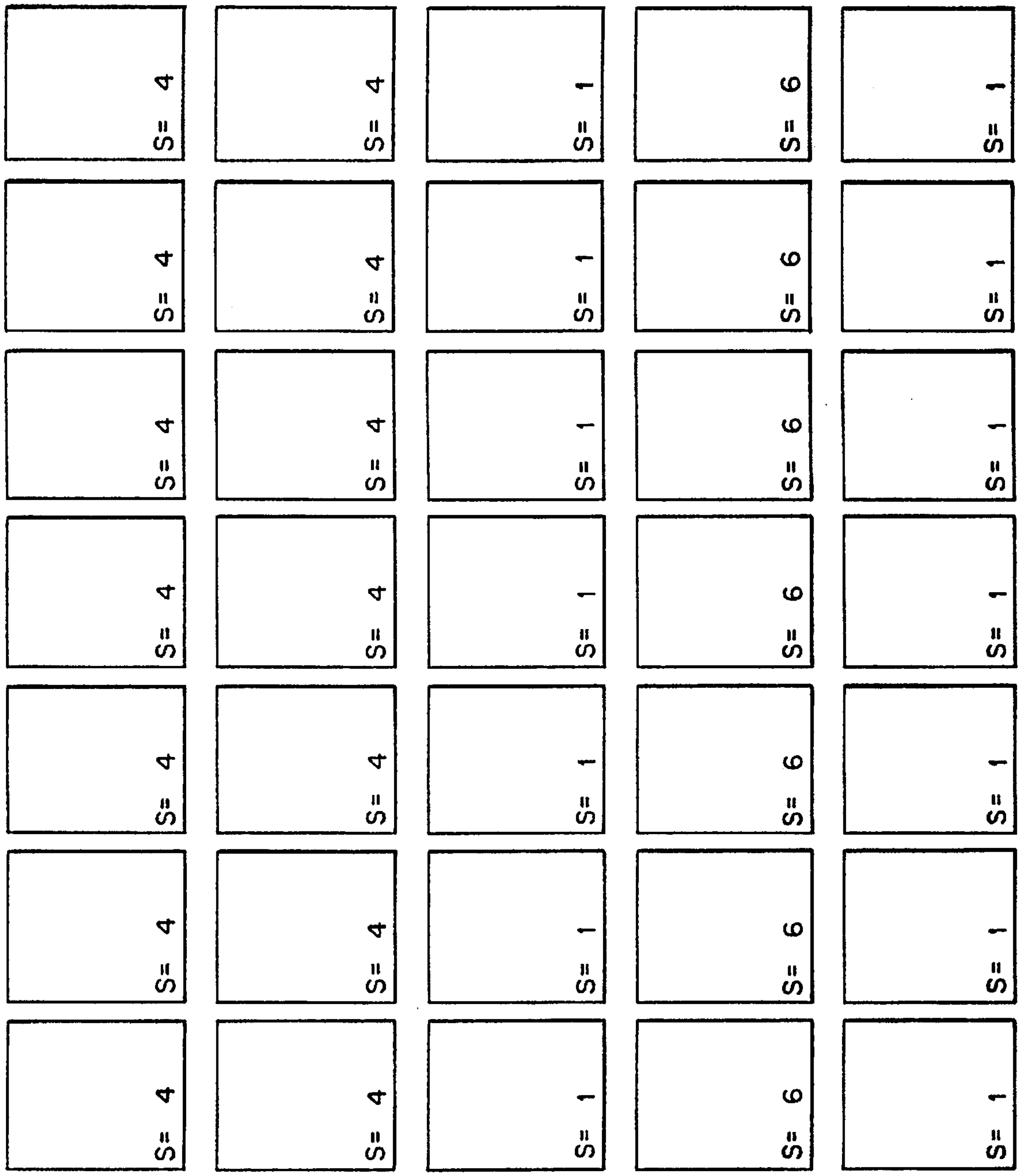

The uniform telephone switch, device independent communications format between the MASTER CALL PROCESS 54 and the PHONE INTERFACE process 56 takes the shape of messages, which correspond to the events listed down the left hand side of FIGS. 20, 21, and 22. Each appearance on a telephone device may have events associated with it, and these events are translated into data messages sent from the PHONE INTERFACE PROCESS 56 to the MASTER CONTROL PROCESS 54. For example, when a new call comes to the telephone device, i.e. the telephone "rings," then the PHONE INTERFACE PROCESS 56 would detect this and send a "RINGING" message to the MASTER CALL PROCESS 54 for the appearance that is ringing. This is shown as the top event in FIG. 20. The set of messages include the following, as indicated in FIGS. 20, 21, and 22, but are not limited to those below, as extended features of telephone device capabilities may be added to the state machine in the future, as new events and messages.

| | |
|---|---|
| RINGING | Incoming call is arriving (ringing). |
| ANSWER (TRUE) | Call has been answered successfully. |
| ANSWER (FALSE) | Call was attempted to be answered, but the answer failed. |
| DIAL(RING) | An outgoing call successfully received ringing on the far end or timed out after a configurable number of seconds |
| DIAL(TONE) | An outgoing call resulted in a busy signal or other invalid tone on the far end |
| DIAL (FALSE) | An outgoing call could not be placed |
| HOLD(TRUE) | A call just successfully went on hold |
| HOLD (FALSE) | A call that was attempted to be put on hold could not be put on hold because the far end party hung up |
| XFER(RING) | A transferred call got ringing or a timeout on the far end (party to whom call wold be transferred) |
| XFER(TONE) | A transferred call got a busy or invalid tone on the far end (party to whom call would be transferred) |
| XFER(FAIL) | A transfer failed because the original connected party hung up |

-continued

| | |
|---|---|
| CONF(RING) | A conference call got ringing or a timeout on the far end (party to whom call would be transferred) |
| CONF(TONE) | A conference call got a busy or invalid tone on the far end (party to whom call would be transferred) |
| CONF(FAIL) | A conference failed because the original connected party hung up |
| CONF(TRUE) | A conference completed successfully |
| DROP(TRUE) | The user hung up the telephone |
| NEWDISP( ) | A new display is appearing on the telephone |
| CURRENT (APP) | A new appearance is now the active appearance among the multiple appearances |
| REDIR (FALSE) | An attempt to redirect a ringing call to another extension failed. |

The State Machine controls all of the "run time", i.e., call processing, activities of the invention, in the sense that each action taken by the invention is triggered by either a user request or an event transmitted by the telephone device. In other words, the run time portion of the invention is completely "event driven", and the actions that are taken based upon the event are embodied in the State Machine. The actions taken by the State Machine in the MASTER CALL PROCESS include various functions; such as, writing records to call logs, sending messages to programs to invoke triggers, pop-up application screens, place calls, etc. The communication between all programs within the invention is done in a uniform messaging scheme which is telephone switching device, and application independent. Telephone switching device dependent communications are strictly isolated to the one PHONE INTERFACE process 56, thereby providing the uniform product claimed herein.

There are three other process elements in the software of the invention shown in FIG. 13. Process 51 is the hot key management process. This includes the use of a "hook" within the Windows environment that allows a hot key to be globally defined that will bring up the user interface of the invention (process 58) no matter what state or application the user may currently be in. This hot key may be specified within a defined list of choices given to the user. The hot key is used to toggle the state of the user interface. If the user interface is active, then the hot key will minimize the user interface to an iconized state. If the user interface is not active but visible, the hot key will make the user interface the active window for the user. If the user interface is in an iconized inactive state, then the hot key will restore the user interface window and make it the active user window.

Process 53 is the outbound call management process. This process is activated upon the entering of the outdialing "hot keys" by the user that signal the outbound call management process to extract call information, specifically a number to be dialed, from an application, and then to dial this number. The outbound call management process decides which application to extract the called number from, extracts the number, and then passes a dial request message to the Master Call Process (54) for actual placement of a call. The outbound call management process makes it decision on which application the information is to be taken from, based upon the fact that it is the last application that was active with the user prior to the hot key dialing request being initiated. The commands required to extract the telephone called number are retrieved form files configured (trained) earlier by the user for this particular application and current window, called outgoing call triggers. If the user requests a hot key dialing, and the last active window has no associated command file, the outbound call management process does not send any dial requests to the Master Call Process.

Process 55 is the incoming call management process. This process is responsible for running the rules matching algorithm specified in FIG. 18 and 19. The incoming call management process is invoked at various times based upon the user's configuration. It may be invoked when incoming calls first arrive, upon the user answering the call, whether call information changes, or upon user demand.

There are four other library elements and one module in the software of the invention described in FIG. 13. Library 57 is the hot key library. It contains the functions to enable or disable a new hot key as the key that will activate and deactivate the user interface. Library 59 is the keystroke macro library. This library contains the functions required for the user to record and playback computer keystroke commands that are associated with incoming and outgoing call triggers. Library 60 is the log file library. It contains the functions that read and write call records to call log file, so that a user can retrieve a history of the calls placed or received. Library 61 is the interprogram data passing library. It contains the functions that create data elements that are passed among the various modules within the invention. These data elements typically include basic call information such as the calling number, called number, telephone display characters, etc.

Module 62 is a timer configuration file that specifies timing values specifies timing values specific to telephone call processing. This file allows the invention to change how it reacts to error conditions in the telephone device. For example, if a call is placed, but no ringing or busy tone is ever detected by the telephone device, the invention will "time out" and assume the call is completed after a certain number of seconds, specified in this configuration file. The adjustment of these time values allows for a variety of performance conditions for the user, depending upon how the user wants the system to react under such error conditions.

Although specific features of the invention are shown in some drawings and not others, this is for convenience only as some features may be combined with any or all of the other features in accordance with the invention.

And, other embodiments will occur to those skilled in the art and are within the following claims:

What is claimed is:

1. A computer-telephone integration system, comprising:

a computer;

a vendor specific switching device coupled to the computer, that receives vendor specific switching device commands, that controls and queries a telephone system, and that outputs vendor specific switching device commands;

a library stored on the computer, including an established set of telephone commands that communicate to said computer a state of the vendor specific switching device, and a library of vendor specific switching device commands capable of commanding a number of different vendor specific switching devices to perform telephone functions; and a telephone interface means, operable on said computer, for receiving the vendor specific switching device commands from the vendor specific switching device and for translating said vendor specific switching device commands into the established telephone commands so as to uniformly process incoming telephone functions.

2. The computer-telephone integration system of claim 1, in which said telephone interface means includes a means for translating said established telephone commands into the vendor specific switching device commands in order to uniformly process outgoing telephone functions.

3. The computer-telephone integration system of claim 1, further including a call processor means, operable on the computer and coupled to the telephone interface means, for receiving the telephone commands, for processing the telephone commands to determine a current state of the vendor specific switching device, for determining a next state of the vendor specific switching device, and for outputting the telephone commands corresponding to the next state to the telephone interface means.

4. The computer-telephone integration system of claim 3, further including a call control means, operable on the computer, that is responsive to user requests and that is in communication with said call processor means, for communicating the user requests to the call processor means in the form of said established telephone commands.

5. A system that uniformly processes incoming telephone functions and outgoing telephone functions, including a computer in communication with a telephone system through a vendor specific switching device, the system further comprising:

a library, stored on the computer, including an established set of telephone commands that communicate to the computer a state of the vendor specific switching device, and a library of vendor specific switching device commands capable of commanding a number of different vendor specific switching devices to perform the incoming and outgoing telephone functions; and a telephone interface, operable on the computer, that receives the vendor specific switching device commands from the vendor specific switching device and translates said vendor specific switching device commands into the established telephone commands so as to uniformly process the incoming telephone functions.

6. The system of claim 5, wherein said telephone interface also translates said established set of telephone commands into the vendor specific switching device commands so as to uniformly process the outgoing telephone functions.

7. The computer-telephone integration system of claim 5, further including a state machine, operable on the computer and connected to the telephone interface, that receives the telephone commands, that processes the telephone commands to determine a current state of the vendor specific switching device, that determines a next state of the vendor specific switching device, and that outputs the telephone command corresponding to the next state to the telephone interface.

8. The system of claim 7, further including a call controller, operable on the computer, that is responsive to user requests and is in communication with the state machine, and that communicates the user requests to the state machine in the form of the telephone commands.

9. A method for establishing a computer-telephone integration system including a computer in communication with a telephone system through a vendor specific switching device, wherein the telephone integration system processes incoming and outgoing telephone functions, the method comprising the steps of:

establishing on the computer, a library including a set of telephone commands that communicate to the computer a state of the vendor specific switching device, and establishing a library of vendor specifics switching device commands capable of commanding a number of different vendor specific switching devices to perform the incoming and outgoing telephone functions;

receiving with the computer from the vendor specific switching device, the vendor specific switching device commands; and translating said vendor specific switching device commands into the telephone commands for uniformly processing the incoming telephone functions.

10. The method of claim 9, further including the steps of translating said telephone commands into the vendor specific switching device commands; and outputting the vendor specific switching device commands to the vendor specific switching device so as to uniformly process the outgoing telephone functions.

11. The method of claim 10, further including the steps of:

processing the telephone commands to determine a current state of the vendor specific switching device;

determining a next state of the vendor specific switching device; and determining the telephone command corresponding to the next state.

12. A method for performing telephone functions with a computer-telephone integration system including a computer in communication with a telephone system through a vendor specific switching device, the method comprising the steps of:

receiving, with the computer, the vendor specific switching device commands from the vendor specific switching device;

converting the vendor specific switching device commands into telephone commands that communicate a state of the vendor specific switching device to the computer; and processing the telephone commands with the computer so as to uniformly perform the telephone functions independent of the vendor specific switching device commands.

13. The method of claim 12, further including the steps of converting said telephone commands into the vendor specific switching device commands, outputting the vendor specific switching device commands to the vendor specific switching device, and executing the telephone functions with the vendor specific switching device.

14. The method of claim 13, further including the steps of determining with the computer, a current state of the vendor specific switching device, determining with the computer a next state of the vendor specific switching device, determining the telephone command corresponding to the next state, and converting the telephone command into the vendor specific switching device command for operating the vendor specific switching device.

15. The method of claim 13, wherein the step of converting the telephone commands into the vendor specific switching device commands includes searching a library of the telephone commands until a match for the telephone command is found and selecting the vendor specific switching device command associated with the telephone command.

16. The method of claim 12, wherein the step of converting the vendor specific switching device commands includes searching a library of vendor specific switching device commands until a match for the vendor specific switching device command is found and selecting the telephone command associated with the received switching device command.

17. A computer-telephone integration system for uniformly processing telephone functions, including a computer in communication with a telephone system through a vendor specific switching device, the computer-telephone integration system further comprising:

a means for receiving vendor specific switching device commands from the vendor specific switching device;

a means for converting said vendor specific switching device commands into telephone commands that communicate a state of the vendor specific switching device to the computer; and a means for processing said telephone commands so as to uniformly process the telephone functions independent of the vendor specific switching device commands.

18. The computer-telephone integration system of claim 17, wherein said means for converting the vendor specific switching device commands includes a library of the vendor specific switching device commands corresponding to a number of vendor specific switching devices, that command the number of vendor specific switching devices to perform the telephone functions.

19. The computer-telephone integration system of claim 17, further comprising:

a means for determining a current state of the vendor specific switching device, for determining a next state of the vendor specific switching device, and for determining a telephone command corresponding to the next state; and a means for converting the telephone command into a vendor specific switching device command and for outputting the vendor specific switching device command to the vendor specific switching device.

20. The computer-telephone integration system of claim 19, wherein the means for converting the telephone command includes a library of the vendor specific switching device commands associated with the telephone commands.

21. A processor coupled to a telephone system via a vendor specific switching device, that performs telephone processing, the processor comprising:

a set of telephone commands that communicate a state of the vendor specific switching device to the processor;

a library of vendor specific switching device commands corresponding to a number of vendor specific switching devices, that command the switching device to perform the telephone functions; and a state machine having a current state corresponding to the state of the vendor specific switching device that determines a next state corresponding to a next state of the vendor specific switching device, in response to an event occurring on either one of the processor and the vendor specific switching device, that determines a telephone command from the set of telephone commands corresponding to the next state, and that outputs the telephone command.

22. The processor of claim 21, further comprising an interface unit disposed between and coupled to each of the state machine and the vendor specific switching device, that converts an outgoing telephone command to a vendor specific switching device command and that converts an incoming vendor specific switching device command to a telephone command, the interface unit communicating with the switching device in the vendor specific switching device commands and communicating with the state machine in the telephone commands.

23. The processor of claim 22, wherein the interface unit detects an event occurring on the vendor specific switching device by receiving the vendor specific switching device command, and communicates the event to the state machine by outputting the corresponding telephone command.

24. The processor of claim 23, further comprising a call processor in communication with the interface unit and the state machine, the call processor in response to the event occurring on the switching device and detected by the interface unit, initiating the state machine to determine the next state and the telephone command corresponding to the next state.

25. The processor of claim 22, further comprising a call controller in communication with a user interface and the state machine, the call controller in response to an event occurring at the user interface, initiating the state machine to determine the next state and the telephone command corresponding to the next state.

26. A method for processing telephone calls on a processor-based telephone integration system coupled to a telephone system via a vendor specific switching device, the method comprising the steps of:

ascertaining, with a processor of the processor-based telephone integration system, a current state of the processor-based telephone integration system corresponding to a current state of the vendor specific switching device;

in response to an event initiated by one of the switching device and the processor, determining a next state of the processor-based telephone integration system corresponding to a next state of the vendor specific switching device;

determining a telephone command corresponding to the next state;

converting the telephone command corresponding to the next state to a vendor specific switching device command; and outputting the vendor specific switching device command to the vendor specific switching device.

27. The method of claim 26, further comprising the step of in response to the event initiated by the vendor specific switching device, communicating the event from the vendor specific switching device to the processor with the vendor specific switching device command.

28. The method of claim 26, further comprising the step of in response to an event initiated by a user of the system, communicating the event to the processor with the telephone command.

* * * * *